(12) United States Patent
Ohsawa

(10) Patent No.: US 6,866,076 B2
(45) Date of Patent: Mar. 15, 2005

(54) TIRE HAVING LONGITUDINALLY EXTENDING SMALLER GROOVES FORMED IN THE WALLS OF A GROOVE

(75) Inventor: Yasuo Ohsawa, Tachikawa (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/777,653

(22) Filed: Feb. 7, 2001

(65) Prior Publication Data

US 2001/0032691 A1 Oct. 25, 2001

(30) Foreign Application Priority Data

| Feb. 7, 2000 | (JP) | ................................ 2000-029656 |
| Jun. 14, 2000 | (JP) | ................................ 2000-178746 |
| Nov. 24, 2000 | (JP) | ................................ 2000-358452 |

(51) Int. Cl.$^7$ ................. B60C 11/13; B60C 101/00; B60C 103/00
(52) U.S. Cl. ................. 152/209.21; 152/902
(58) Field of Search ................. 152/209.15, 209.18, 152/209.21, 902, 209.28, DIG. 3

(56) References Cited

U.S. PATENT DOCUMENTS

| 4,706,910 A | * 11/1987 | Walsh et al. ............... 244/130 |
| 6,253,815 B1 | * 7/2001 | Kemp et al. ........... 152/209.19 |
| 6,415,835 B1 | * 7/2002 | Heinen |
| 2003/0111150 A1 | * 6/2003 | Zimmer et al. ........ 152/209.19 |

FOREIGN PATENT DOCUMENTS

| EP | 393873 | * 10/1990 |
| EP | 820885 | * 1/1998 |
| GB | 565477 | * 11/1944 |
| JP | 3-57704 | * 3/1991 |
| JP | 3-86605 | * 4/1991 |
| JP | 4-201606 | * 7/1992 |
| JP | 4-334606 | * 11/1992 |
| JP | 5-286313 | * 11/1993 |
| JP | 7-17217 | * 1/1995 |
| JP | 7-186633 | * 7/1995 |
| JP | 8-175113 | * 7/1996 |
| JP | 11-151912 | * 6/1999 |
| JP | 2000-158915 | * 6/2000 |

* cited by examiner

Primary Examiner—Steven D. Maki
(74) Attorney, Agent, or Firm—Sughrue Mion, PLLC

(57) ABSTRACT

A tire capable of reducing a resistance to a fluid in a groove to improve the wet performances. By forming smaller grooves (or riblets 20) having a depth set within a range of 0.01 to 0.5 mm at a pitch within a range of 0.01 to 0.5 mm in the walls of a circumferential groove and a transverse groove, more specifically, the resistance to the water flowing in the groove is reduced to improve the drainage efficiency of the groove. By arranging a turbulence generating zone having a number of pointed projections at the groove side faces at the confluence between the circumferential groove and the transverse groove, on the other hand, there is suppressed the separation of the water flow in the vicinity of the confluence. With these constructions, it is possible to improve the wet performances of the tire better than the prior art.

5 Claims, 26 Drawing Sheets

F I G. 3
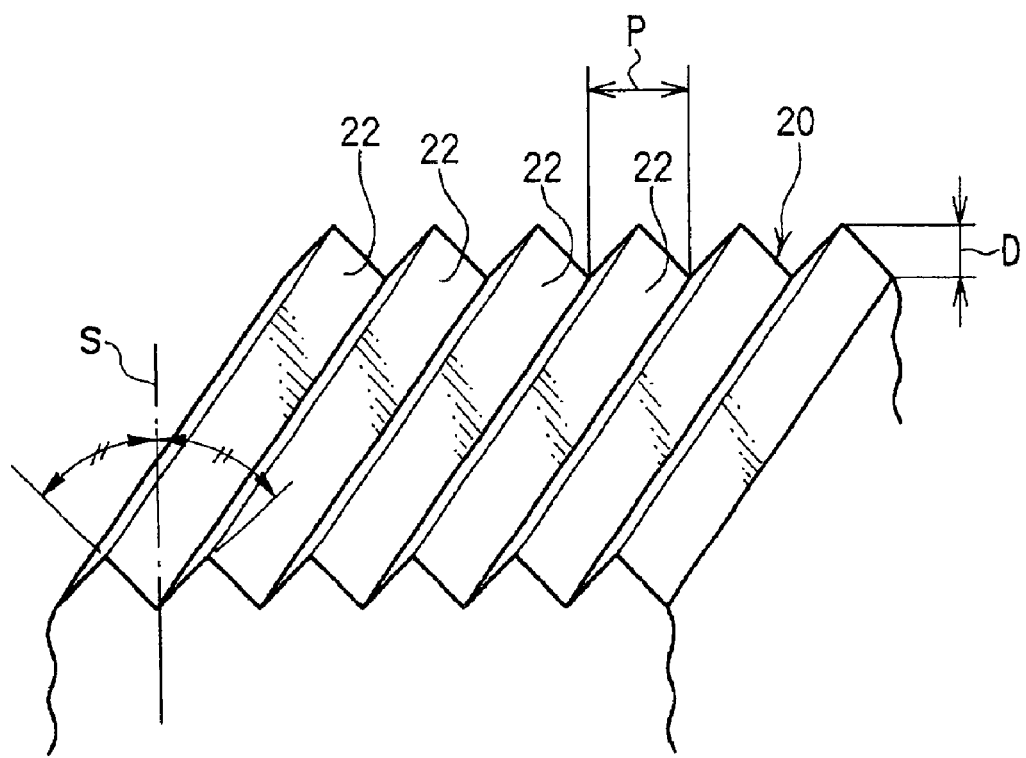

F I G. 4
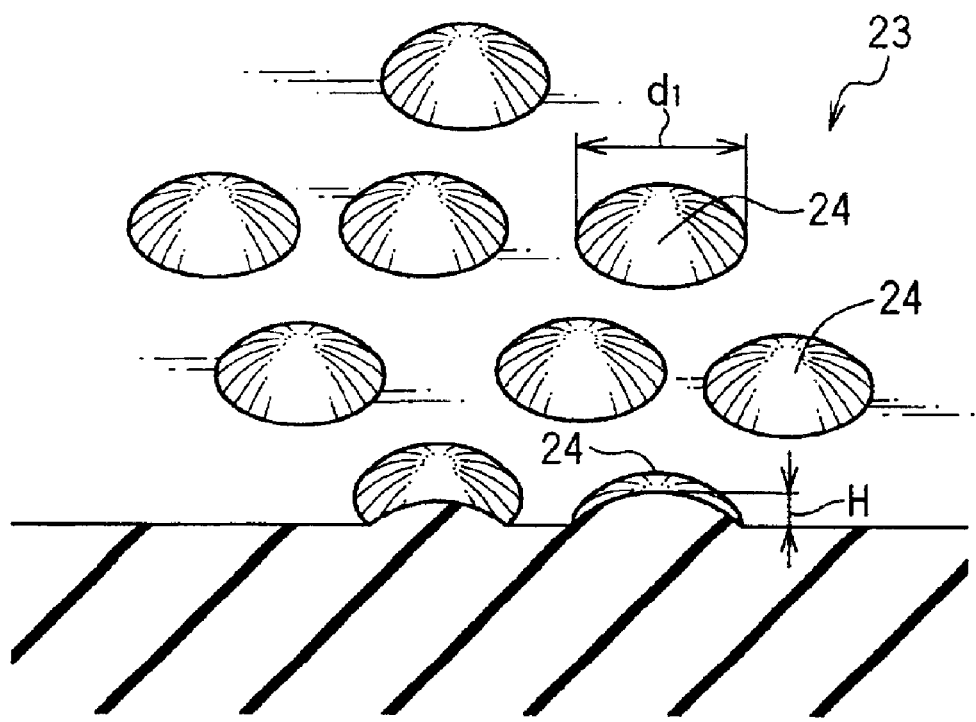

F I G. 6
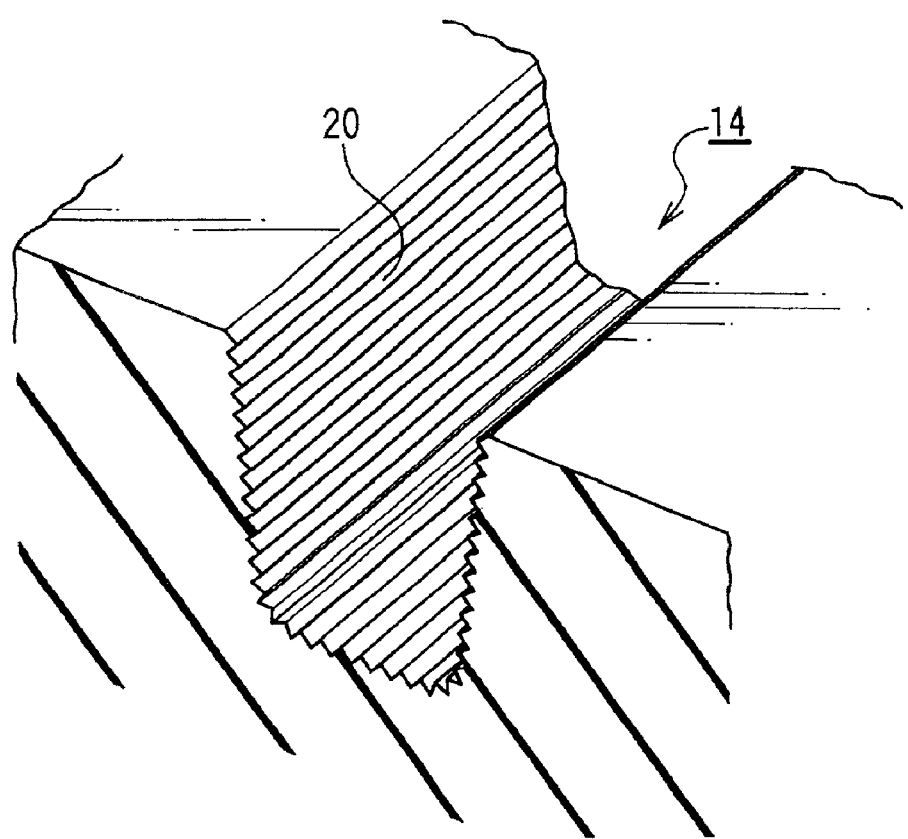

F I G. 7
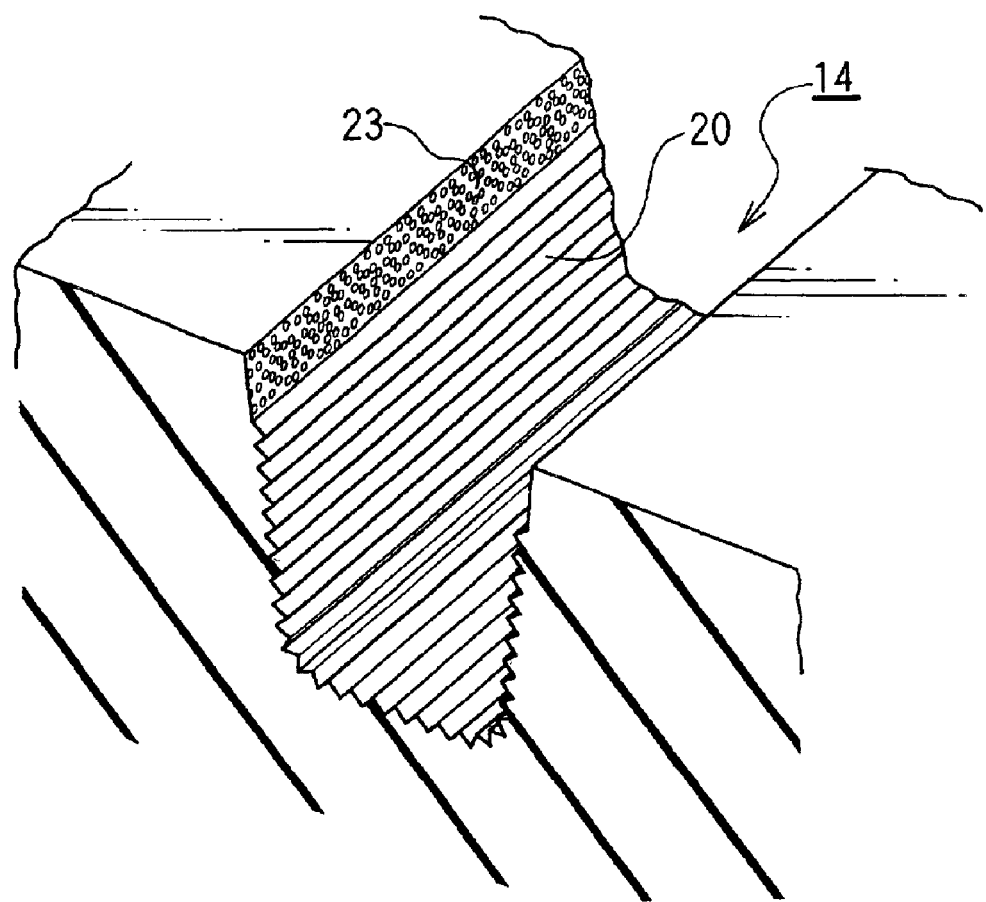

F I G. 1 0
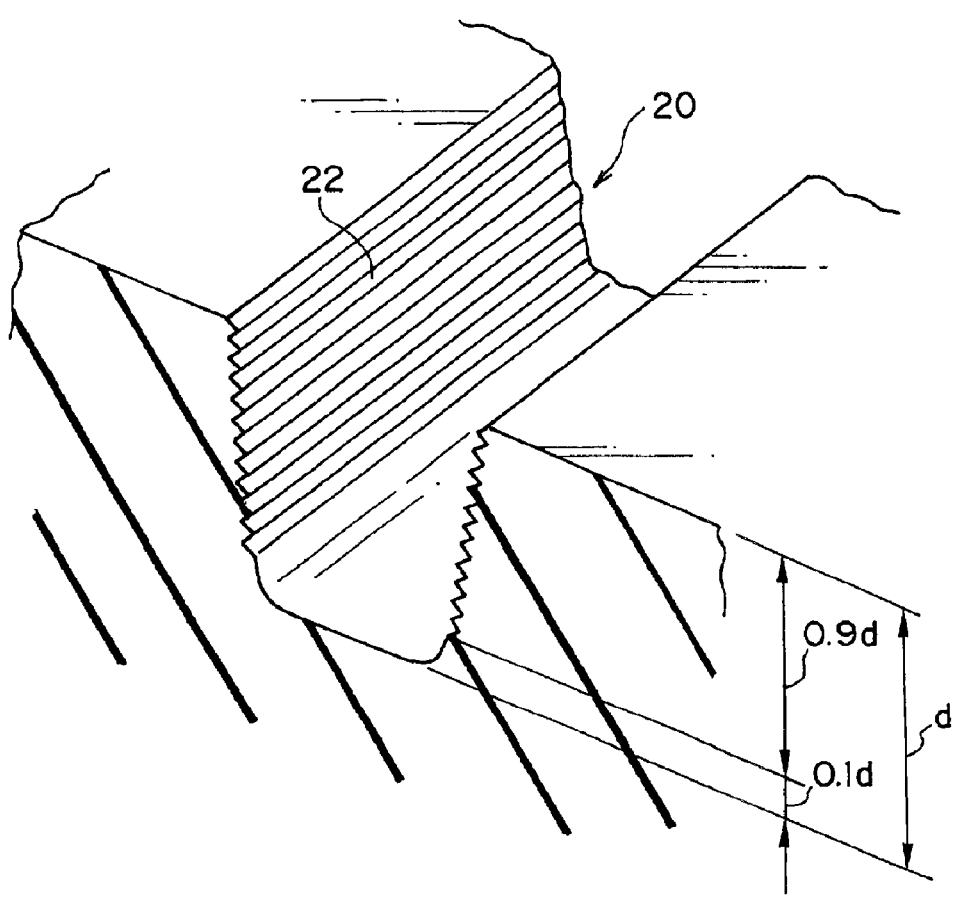

F I G. 1 4
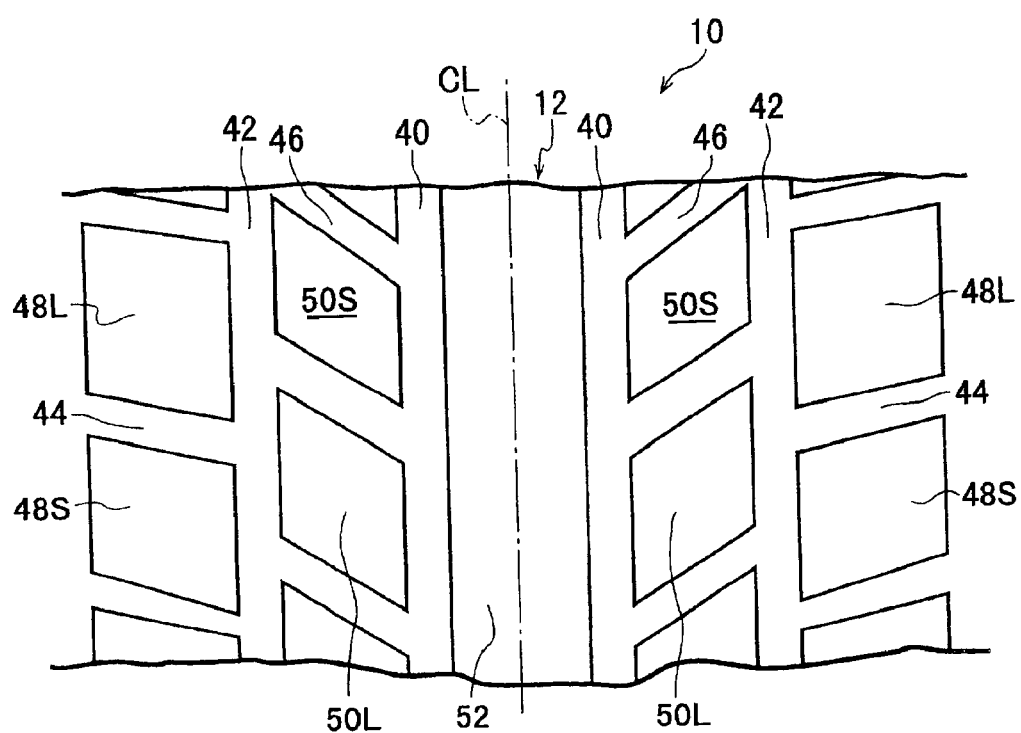

F I G. 1 9
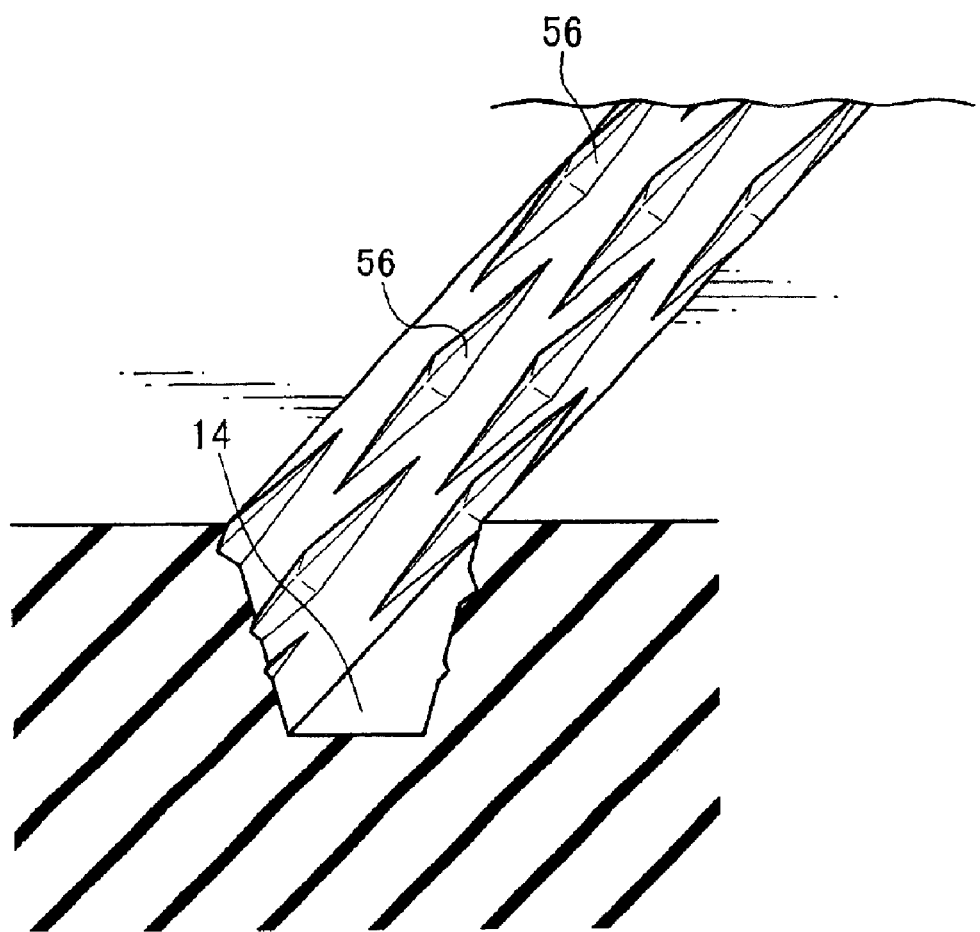

F I G. 2 3
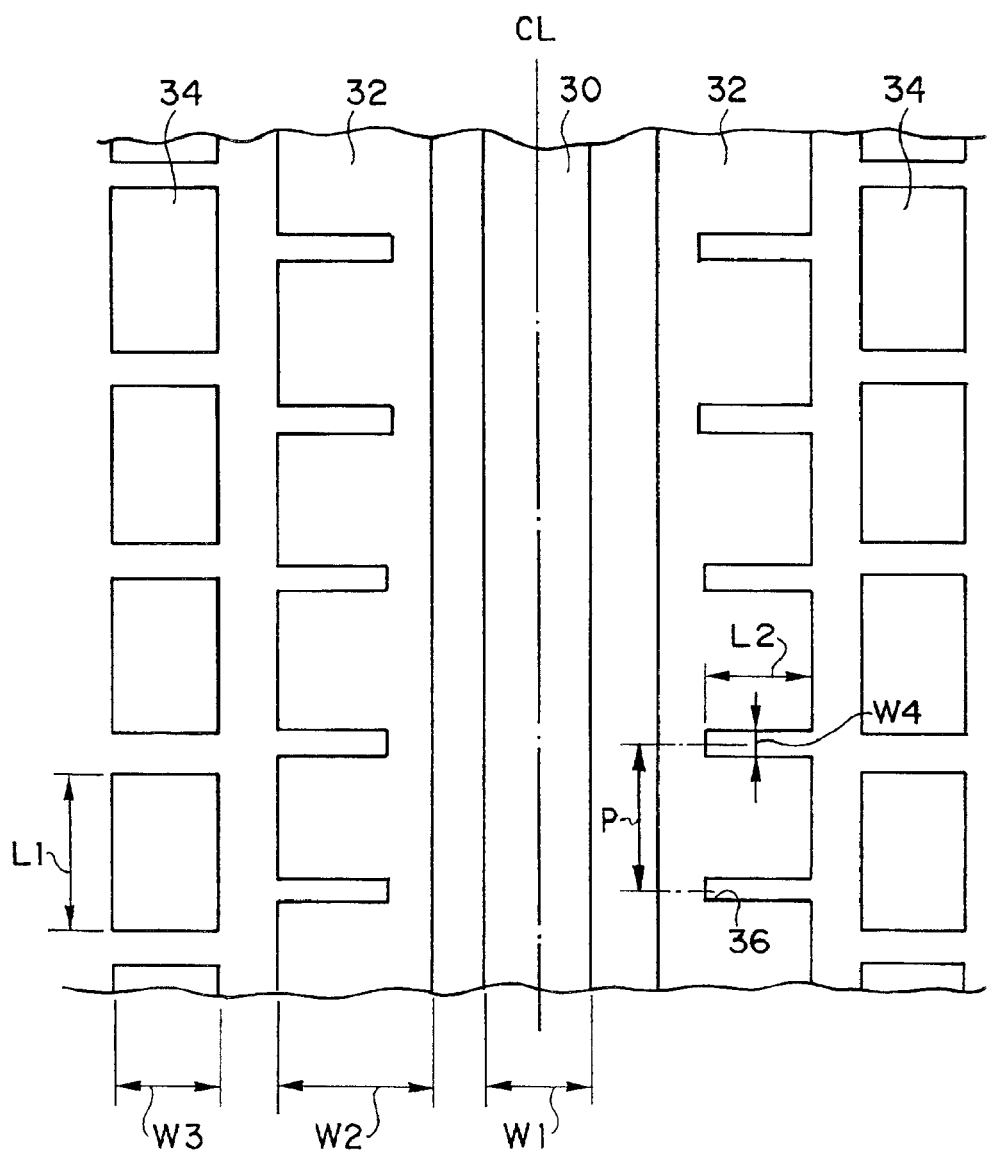

TIRE HAVING LONGITUDINALLY EXTENDING SMALLER GROOVES FORMED IN THE WALLS OF A GROOVE

BACKGROUND OF THE INVENTION

1. Field of the Invention

The present invention relates to a tire and, more particularly, to a tire improved in the wet performances.

2. Description of the Related Art

The tire is provided in its tread with a plurality of grooves for achieving the wet performances.

In order to improve the tire performances on a wet road surface, such as the anti-hydroplaning performances or the wet braking performances, it is necessary to improve the drainage of the grooves.

For improving the drainage, it is necessary to reduce the resistance experienced between the fluid flowing in the grooves and the groove wall faces.

Merely by roughing the groove wall faces, the surface area of the groove walls is increased to raise the resistance.

As the tires having the rough groove wall faces, there have been proposed: (a) Japanese Utility Model Laid-Open No. 037708/1995; (b) Japanese Patent Laid-Open No. 201606/1992; (c) Japanese Patent Laid-Open No. 57704/1991; (d) Japanese Patent Laid-Open No. 009009/1989; (e) Japanese Patent Laid-Open No. 56205/1989; (f) Japanese Patent Laid-Open No. 16617/1993; (g) Japanese Patent Laid-Open No. 151912/1999; (h) Japanese Patent No. 2865765; and (i) Japanese Patent Laid-Open No. 607/1993, for example.

However, the various experiments and investigations of the above-specified proposals have revealed: that the proposals (a), (b), (c) and (g) were encountered by the problem of a raised resistance, that the proposals (d) and (e) were adversely affected by the turbulences in the flow by the sipes in the grooves thereby to increase the resistance; and that the proposal (f) had too large projections to control the flow and increased the groove surface areas to raise the resistance.

In the proposal (h), on the other hand, the groove wall is provided with a plurality of small steps having a height X (i.e., a size measured along the radial direction of the tire) of 0.5 to 2 mm and a width Y (i.e., a size measured along the tread surface of the tire) of 0.2 to 1 mm, as shown in FIG. 26, thereby to improve the performance on the snow.

If these steps of the proposal (h) are assumed as smaller grooves so that their sizes are converted into a depth D and a pitch P of the smaller grooves, these smaller grooves have the depth D of about 0.18 to 0.89 mm and the pitch P of about 0.54 to 2.24 mm. In this case, the improvement in the anti-hydroplaning performances is rather disturbed by the excessively large pitch P of the smaller grooves.

On the other hand, the proposal (i) is also provided with small steps or smaller grooves which are formed against the noises, and these smaller grooves have too large a size as in the proposal (h) to improve the anti-hydroplaning performances.

SUMMARY OF THE INVENTION

Considering the facts thus far described, the invention has an object to provide a tire which can reduce the resistance to a flow in grooves reliably thereby to improve the wet performances.

After the various experiments and investigations, the inventor of the present invention have found out that if a tread is provided in its groove wall with a group of minute grooves extending along the flow and arranged transversely at an equal spacing, that is, the so-called "riblets" and if the minute grooves have their spacing and depth set individually within a range of 0.01 to 0.5 mm, a number of minute vortexes can be generated along the groove walls to reduce the frictional resistance between the water and the groove walls thereby to improve the wet performances at an actual running time.

It has also been found out that when the water in the grooves is separated from the groove walls, the resistance rises to lower the wet performances. After the additional experiments and investigations, therefore, it has been found out that the separation can be suppressed by providing turbulence generating means for generating turbulent flows upstream of the separation point to impart the energy to the turbulent flow. It has also been found out that a number of minute recesses or projections in the vicinity of the corners of blocks are effective especially for the case of the block pattern.

In order to improve the anti-hydroplaning performances for a new tire, on the other hand, it has been found effective for suppressing the separation, as might otherwise be caused at the walls of the grooves in the vicinity of the tread surface to provide a number of minute recesses or projections at the groove walls in the vicinity of the tread surface i.e., at the groove walls in the vicinity of the tire surface in both the straight and block patterns.

According to the first aspect of the invention in a tire having a tread in which grooves are formed, a plurality of smaller grooves are formed in the walls of each of said groove so as to extend in the longitudinal directions of said groove, and said smaller grooves have a depth set within a range of 0.01 to 0.5 mm and a pitch set within a range of 0.01 to 0.5 mm.

According to the tire based on the first aspect, the smaller grooves having the depth set within the range of 0.01 to 0.5 mm and extended in the longitudinal directions of said groove are arranged at the pitch set within the range of 0.01 to 0.5 mm. Therefore, the resistance to the water flowing in the grooves is reduced to improve the drainage efficiency of the grooves. As a result, it is possible to improve the wet performances of the tire.

Here, the depth of the smaller grooves provided in the groove is the deepest one that is measured normal to the groove walls.

In the tire based on the first aspect, according to a second feature of the invention, the depth of said smaller grooves is set within a range of 0.05 to 0.4 mm, and the pitch of said smaller grooves is set within a range of 0.05 to 0.4 mm.

According to the tire based on this second aspect, the depth of said smaller grooves is set within a range of 0.05 to 0.4 mm, and the pitch of said smaller grooves is set within a range of 0.05 to 0.4 mm. Therefore, the effect to reduce the resistance to the water flowing in the grooves can be especially enhanced to improve the drainage efficiency of the grooves especially. In other words, the tire performances on a wet road surface are especially enhanced.

In the tire based on the second aspect, according to the third feature of the invention, the sectional shape, as taken at a right angle with respect to the longitudinal directions, of said smaller grooves is made symmetric with respect to the widthwise center lines of said smaller grooves.

If a comparison is made between the groove having the symmetric smaller grooves according to the third aspect and the groove having asymmetric smaller grooves, the groove having the symmetric smaller grooves is preferable because of a lower resistance to the water.

In the tire based on the third aspect, according to the fourth feature of the invention, the sectional shape, as taken at a right angle with respect to the longitudinal directions, of said smaller grooves is an isosceles triangle.

If a comparison is made between the groove having the smaller grooves of the sectional shape of the isosceles triangle normal to the longitudinal directions according to the fourth aspect and the groove having the smaller grooves of another sectional shape such as a rectangle other than the isosceles triangle normal to the longitudinal directions, the groove having the smaller grooves of the sectional shape of the isosceles triangle normal to the longitudinal directions is preferable because of a lower resistance to the water.

In the aforementioned tire, according to the fifth aspect of the invention, a relation of $P \leq 2D$ is satisfied if the depth of said smaller grooves is designated by D and if the pitch P of said smaller grooves is designated by P.

If the relation of $P \leq 2D$ is satisfied for the depth D of the smaller grooves and for the pitch P of the smaller grooves, the effect to reduce the resistance to the water is preferably high.

In the aforementioned tire, according to the sixth aspect of the invention, said smaller grooves are formed in the groove walls continuing in the circumferential directions.

The grooves continuing in the circumferential directions have high influences on the drainage performances, as compared with the grooves in which the continuity of the grooves in the circumferential direction is interrupted. It is, therefore, preferable for improving the drainage efficiency to form the smaller grooves in the groove walls continuing in the circumferential directions, as based on the aforementioned sixth aspect.

In the tire in which ribs and blocks extending in the tire circumferential directions are mixed, for example, the effect to improve the drainage efficiency is higher for the smaller grooves formed in the grooves defining the rib than for the smaller grooves formed in the grooves defining the block pattern.

In the aforementioned tire, according to the seventh aspect of the invention, said smaller grooves are juxtaposed in parallel and have undulating groove wall surfaces.

Where the smaller grooves have the small depth and pitch, the surface working of the mold for the tire is made easier by undulating the groove wall surfaces on the basis of the seventh aspect. By undulating the groove wall surface, the durability of the portions of the mold for forming the smaller grooves is also enhanced.

Here, the undulations indicate that the crests and valleys such as sinusoidal waves are formed of smooth curves (and further that a plurality of triangular mountains are continued to form the crests and valleys through relatively smooth curves).

In the aforementioned tire, according to the eighth aspect of the invention, the vicinity of the bottom of said groove is free of said smaller grooves.

The groove bottom is such a portion of the groove walls as is easily cracked (e.g., ozone-cracked) in service. With the smaller grooves being formed in the vicinity of the groove bottom, therefore, the cracks may grow along the smaller grooves.

In order to suppress the growth of the cracks, therefore, it is preferable that the smaller grooves are absent in the vicinity of the groove bottom.

Here, the vicinity of the groove bottom indicates the portion from the groove bottom (or the deepest portion) to a size of 10% of the groove depth.

In the aforementioned tire, according to the ninth aspect of the invention, the walls in the vicinity of the confluence of said groove and said groove are provided with turbulence generating zones for generating minute turbulences in a fluid flowing in the vicinity of the groove walls thereby to suppress separation of the fluid flowing in said groove.

According to the tire based on this ninth aspect, the turbulence generating zone at the groove wall in the vicinity of the confluence between the groove and the groove generates minute turbulences in the fluid flowing in the vicinity of the groove walls to suppress the separation of the fluid to flow in the groove. As a result, it is possible to improve the wet performances of the tire better.

In the aforementioned tire, according to the tenth aspect of the invention, the walls in the vicinity of the opening of said groove on the tread surface side are provided with turbulence generating zones for generating minute turbulences in a fluid flowing in the vicinity of the groove walls thereby to suppress separation of the fluid flowing in said groove.

According to this tenth aspect, when the water on the wet road surface flows during the run on the road surface into the groove through the opening in the tread surface, it can enter the groove with a low resistance because the minute turbulences are generated in the fluid flowing in the vicinity of the groove wall by the turbulence generating zone disposed at the groove wall in the vicinity of the opening.

As a result, the wet performances of anew tire are better improved.

In the tire having the aforementioned ninth or tenth aspect, according to the eleventh aspect of the invention, said turbulence generating zones have a multiplicity of pointed projections having a diameter within a range of 0.01 to 0.5 mm and a height within a range of 0.01 to 0.5 mm.

According to the tire based on the eleventh aspect, the numerous pointed projections having a diameter within the range of 0.01 to 0.5 mm and a height within the range of 0.01 to 0.5 mm generate the numerous minute turbulences in the vicinity of the groove walls thereby to suppress the separation of the water flow.

In the tire having the aforementioned ninth or tenth aspect, according to the twelfth aspect of the invention, said turbulence generating zones have a multiplicity of recesses having a diameter within a range of 0.01 to 0.5 mm and a depth within a range of 0.01 to 0.5 mm.

According to the tire based on the twelfth aspect, the numerous recesses having a diameter within the range of 0.01 to 0.5 mm and a height within the range of 0.01 to 0.5 mm generate the numerous minute turbulences in the vicinity of the groove walls thereby to suppress the separation of the water flow.

In the aforementioned tire, according to the thirteenth feature of the invention, the pitch of said smaller grooves is set larger on the bottom side of said groove than on the side of the tread surface.

When the tire is used to wear the tread, generally speaking, the groove depth is reduced. As a result, the Reynolds number of the flow in the groove becomes smaller.

When the Reynolds number of the flow in the groove becomes smaller, the optimum pitch and depth of the smaller grooves to generate the minute turbulences for reducing the frictional resistance between the water and the groove walls become larger.

Here are compared the groove walls having a larger pitch of the smaller grooves and the groove walls having a smaller pitch of the smaller grooves. The optimum minute turbulences are more easily generated by the groove walls having the larger pitch of the smaller grooves.

In the tire based on the aforementioned thirteenth aspect, the pitch of the smaller grooves on the bottom side of the groove is set larger than that of the smaller grooves on the tread surface side. Therefore, even if the Reynolds number of the flow in the groove becomes small, the minute turbulences are generated along the groove walls to suppress the resistance to the fluid so that the anti-hydroplaning performances can be made compatible when the tire is new and worn.

In the aforementioned tire, according to the fourteenth aspect of the invention, the depth of said smaller grooves is set larger on the bottom side of said groove than on the side of the tread surface.

When the tire is used to have its tread worn, generally speaking, the groove depth is reduced. As a result, the Reynolds number of the flow in the groove becomes smaller.

When the Reynolds number of the flow in the groove becomes smaller, the optimum pitch and depth of the smaller grooves to generate the minute turbulences for reducing the frictional resistance between the water and the groove walls become larger.

Here are compared the groove walls having a larger depth of the smaller grooves and the groove walls having a smaller depth of the smaller grooves. The optimum minute turbulences are more easily generated by the groove walls having the larger depth of the smaller grooves.

In the tire based on the aforementioned fourteenth aspect, the depth of the smaller grooves on the bottom side of the groove is set larger than that of the smaller grooves on the tread surface side. Therefore, even if the Reynolds number of the flow in the groove becomes small, the minute turbulences are generated along the groove walls to suppress the resistance to the fluid so that the anti-hydroplaning performances can be made compatible when the tire is new and worn.

In the aforementioned tire, according to the fifteenth aspect of the invention, when the groove wall faces of a larger size and the groove wall faces of a smaller size in the groove longitudinal directions are compared, said smaller grooves have the larger depth and/or the larger pitch in the groove walls of the shorter size than in the groove walls of the longer size.

If a comparison is made between the flow velocity of the water in the groove along the longer side of a land portion and the flow velocity of the water in the groove along the shorter side of a land portion, it has been clarified by the experiments by the inventor that the water flow velocity in the groove along the longer side is higher than the water flow velocity in the groove along the shorter side.

If the groove of the higher flow velocity and the groove of the lower flow velocity are compared, the groove of the lower flow velocity has the smaller Reynolds number, and the optimum pitch and depth of the smaller grooves to generate the minute turbulences along the groove wall become larger.

According to the tire having the aforementioned fifteenth aspect, the depth of the smaller grooves and/or the pitch of the smaller grooves are set larger of the groove walls having the shorter size in the groove longitudinal directions than of the groove walls having the longer size in the groove longitudinal directions. Therefore, on the groove wall sides of the shorter size in the groove longitudinal directions, too, it is possible to generate the minute turbulences as on the longer groove wall sides.

According to the sixteenth aspect of the invention, the aforementioned tire comprises: a first land portion defined by a plurality of grooves; a second land portion defined by a plurality of grooves and adjoining said first land portion across a first groove; and a third land portion defined by a plurality grooves and adjoining said first land across said first groove, said third land portion having a wall face which faces the first groove and has a smaller size in the groove longitudinal directions than a wall face of the second land which faces the first groove. In the wall face of the first land portion which faces the first groove, moreover, the depth and/or the pitch of said smaller grooves is larger in the portions confronting said third land portion than in the portions confronting said second land portion.

As has been described in the effects of the aforementioned fifteenth aspect, the water flow velocity in the groove along the longer side of the land portion is higher, and the water flow velocity in the groove along the shorter side of the land portion is lower. Where the tread is provided with: the first land portion; the second land portion defined by the plurality of grooves and adjoining said first land portion across the first groove; and the third land portion defined by the plurality grooves while adjoining said first land across said first groove and having a wall face which faces the first groove and has a smaller size in the groove longitudinal directions than a wall face of the second land which faces the first groove (e.g., where the block-shaped land portion having the larger size in the circumferential directions and the block-shaped land portion having the smaller size in the circumferential directions are provided adjacent to the rib-shaped land portion long in the tire circumferential directions), therefore, the groove walls of the first land portion which faces the first groove is preferably changed partially in the pitch and depth of the smaller grooves for reducing the resistance to the fluid, in accordance with the pitch and depth of the smaller grooves formed in the groove walls of the confronting second land portion and the pitch and depth of the smaller grooves formed in the groove walls of the third land portion.

In the aforementioned tire, according to the seventeenth aspect of the invention, the tread is provided with: a plurality of grooves extending along the tire circumferential directions; and a plurality of grooves extending along the tire widthwise directions, and the walls of the grooves extending along the tire circumferential directions are free of said smaller grooves in a portion thereof intersecting prolongations of the grooves extending along the tire widthwise directions, as connected with the grooves extending along said tire circumferential directions.

In the portion where the groove extending along the tire widthwise directions (as will be called the "transverse groove") and the groove extending along the tire circumferential directions (as will be called the "circumferential groove") join into each other, the flow in the groove has not the simple directivity but the complex directivity. If the smaller grooves are formed in the groove walls of the portion where such a complex flow is established, the resistance reducing effect may not be able to be exhibited.

Especially where the smaller grooves are formed in the groove wall faces where the flow from the transverse groove impinges, such as in the widthwise side faces of the land portion such as the ribs or blocks extending in the circumferential directions, it is difficult to align the direction of the smaller grooves to the flow direction.

In this case, the groove walls are free of the smaller grooves so that the resistance can be reduced without disturbing the complex flow at the confluence any more.

In the aforementioned tire, according to the eighteenth aspect of the invention, said smaller grooves are undulated to have an amplitude with respect to a reference line parallel to the surface of said tread, and said smaller grooves have a period set within a range of 2 to 60 mm and an amplitude set within a range of 0.1 to 3 mm.

Generally speaking, the actual road surface is not completely flat but has small undulations as on the asphalt-paved road surface. If the water flow in the groove is observed in detail when the tire turns on the water existing over the road surface, it has been found out by the experiments by the inventor that the flow is influenced by the undulations of the road surface so that it flows in substantially the same directions as those of the undulations of the road surface.

At this time, the smaller grooves of the prior art parallel to the circumferential directions may fail to coincide with the directions of the undulations of the road surface (substantially in the water flow directions), and the effects to improve the anti-hydroplaning performances may be low.

In the actual tire, the groove is not smooth, but the block, the sipe and the wall difference are present in the adjoining portion, so that the flow in the groove is made turbulent. With these turbulences, the effects to improve the anti-hydroplaning performances may be low even if the smaller grooves are formed to extend on lines parallel to the tread surface of the tire.

According to the detailed observations of the drainage from the groove of the tire, the water residing in parallel with the road surface will flow in parallel with the road surface. However, the groove just before grounding on the road (i.e., just before the treading) is not parallel to the road surface. When the smaller grooves in the circumferential directions are not aligned with the road surface and the water flowing direction, it has been found that the effects to improve the anti-hydroplaning performances may be low even with the smaller grooves.

In the tire based on this aspect, the smaller grooves are also undulated in the groove at the same level as that of the roughness of the road surface so that they can match the various directions of the turbulent flows thereby to reduce the flow resistance in the groove.

According to the nineteenth aspect of the invention, said smaller grooves formed in the walls of the groove extending along the tire circumferential directions are provided in plurality at a spacing in the tire circumferential directions and are each so inclined with respect to said tread surface that the distance from said tread surface may be increased the more in the tire-rotating direction in the vicinity of the grounding surface of the tire, and are made parallel to the road surface at least at their end portions on the tire advancing side in the region of the grounding surface on the tire advancing side and within a range of no more than 5 mm from the road surface.

In order to improve the drainage of the groove at the tire treading time, the smaller grooves may be formed to become parallel to the road surface just before the tire treads.

Just before this treading, the water flow direction is generally parallel to the road surface, but the groove direction is inclined with respect to the road surface.

In order to arrange the smaller grooves in the same direction of the water flow, therefore, it is necessary to incline the smaller grooves on the groove wall faces with respect to lines parallel to the tread surface.

Generally speaking, the pattern design of the tire is made to improve the drainage in the forward advancing direction. If the smaller grooves are formed as in the tire based on this aspect, the drainage at the treading time is made directive so that the direction of the smaller grooves is aligned with the flow direction to improve the drainage at the treading time.

In the aforementioned tire, according to a twentieth aspect of the invention, when a rib-shaped portion formed between said smaller grooves is viewed in a cross-section which is taken in a direction normal to the longitudinal directions of said smaller grooves, the relation $L2 \geqq 0.6\ L1$ is established. L1 and L2 are defined as follows. Given that the intersection between a prolongation of the wall face of one smaller groove on the bottom side thereof and a prolongation of the wall face of the other smaller groove on the bottom side thereof is designated by point A, and that the intersection between the wall face of said rib-shaped portion of the one smaller groove on the crest side thereof and the wall face of the rib-shaped portion of the other smaller groove on the crest side thereof is designated by point B, L1 is the distance from a virtual line joining the bottom of the one smaller groove and the bottom of the other smaller groove to said point A, and L2 is the distance from said virtual line to said point B.

By forming the smaller grooves in the groove walls, the minute vortexes having their axes in the flow direction are generated to reduce the resistance of the groove walls when the vortexes leave the groove walls.

If the rib-shaped portion between the smaller grooves has a sharp crest, the generated vortexes contact with the small region in the vicinity of the crest of the rib-shaped portion so that the resistance to the water flow can be reduced.

If the crest of said rib-shaped portion is rounded or flattened, however, the area for the generated vortexes to contact may be increased not to reduce the resistance to the water flow.

The inventors of the present invention have measured the resistances to the water flow while observing the vortexes by changing the shape of said rib-shaped portion variously. These measurements have revealed that the resistance to the water flow can be reduced without fail by making the shape of the rib-shaped portion sharper than a certain extent, that is, when the rib-shaped portion formed between said smaller grooves is viewed in the cross-section which is taken in a direction normal to the longitudinal directions of said smaller grooves, the relation $L2 \geqq 0.6\ L1$ is established. L1 and L2 are defined as follows. Given that the intersection between the prolongation of the wall face of one smaller groove on the bottom side thereof and the prolongation of the wall face of the other smaller groove on the bottom side thereof is designated by point A, and the intersection between the wall face of said rib-shaped portion of the one smaller groove on the crest side thereof and the wall face of the rib-shaped portion of the other smaller groove on the crest side thereof is designated by point B, L1 is the distance from the virtual line joining the bottom of the one smaller groove and the bottom of the other smaller groove to said point A, and L2 is the distance from said virtual line to said point B.

In the aforementioned tire, according to the twenty first aspect of the invention, if the wall of said smaller groove on the tread surface side is designated by a first groove wall and if the angle of inclination of said first groove wall, with respect to a line normal to the wall of the groove where the smaller groove is formed, is designated by θ1, said inclination angle θ1 is set larger on said first (groove) wall of the smaller groove formed on the bottom side of said groove than on said first wall of the smaller groove formed on the tread surface side.

Where the smaller grooves extending in the groove longitudinal directions are to be formed in the groove walls, these groove walls may be broken in the vicinity of the bottom portion thereof by the mold due to the small grooves in the portion being hooked by the mold, if the sectional shapes of the smaller grooves are made identical independently of the groove depth positions. When the smaller grooves having a large bite into the groove walls are formed in the deep portion of the groove, for example, the rib-shaped portion between the smaller grooves is easily broken when the tire is extracted from the mold. This is because the portion in the vicinity of the groove bottom is provided with the belt of the tire and has a high rigidity. Due to this, the tire is hard to be deformed when extracted from the mold, so that the smaller grooves are caught by the mold (specifically, the undulated portions to form the smaller grooves).

As in the tire based on this aspect, therefore, if the inclination angle θ1 of the first groove wall is set larger on the first groove wall of the smaller groove formed on the bottom side of said groove than on the first groove wall of the smaller groove formed on the tread surface side, the smaller grooves in the vicinity of the groove bottom portion are hardly caught by the mold so that the groove walls can be prevented from being broken.

In the tire based on the aforementioned twenty first aspect, according to the twenty second aspect of the invention, if the wall of said smaller groove on the bottom side thereof is designated by a second groove wall and if an angle, as contained between said first groove wall and said second wall is designated by θ2, said angle θ2 is set larger of said smaller groove formed in the bottom side of said groove than of the smaller groove formed in the tread surface side.

Where the smaller grooves are formed in the groove walls, these groove walls may be broken in the vicinity of the bottom portion thereof by the mold due to the small grooves in the portion being hooked by the mold, as described on the effects of the aforementioned twenty first feature, if the sectional shapes of the smaller grooves are made identical independently of the groove depth positions.

As in the tire based on the aforementioned twenty second aspect, therefore, the angle θ2 contained between the first groove wall and the second groove wall is set larger of said smaller groove formed in the bottom side of said groove than of the smaller groove formed in the tread surface side. Then, the smaller grooves in the vicinity of the groove bottom portion are further hardly caught by the mold so that the groove walls can be prevented from being broken.

In the aforementioned tire, according to the twenty third aspect of the invention, the bottom of said smaller groove is shaped to have a generally arcuate shape, when viewed in a section normal to the longitudinal directions of said smaller groove, and the rib-shaped portion between the smaller grooves is shaped to have an acute angle less than 90 degrees at its crest.

When the tire is extracted from the mold, the rib-shaped portion between the groove and the groove is easily caught by the mold, and the groove walls may be broken.

In the tire based on this aspect, the bottoms of the smaller grooves are formed into the generally arcuate shape, and the rib-shaped portion is given the acute angle at its crest. As a result, the rib-shaped portion is more rigid at its root portion and less rigid at its crest portion so that it can be easily deformed. Therefore, it is possible to prevent the rib-shaped portion from being broken when the tire is extracted.

In the aforementioned tire, according to the twenty fourth aspect of the invention, said smaller grooves are absent in the vicinity of the tread surface.

It is accompanied by the difficulty in the manufacture of the mold that the smaller grooves are formed in the portions of the groove wall faces near the treading face (that is, in the region of 5% or less, or preferably 10% or less of the groove depth from the tread surface). It is also difficult to form the smaller grooves in the vicinity of the open end of the groove homogeneously in the circumferential directions when the tire is vulcanized (in other words, unless the portion to form the smaller grooves in the vicinity of the opening of the groove are accurately and precisely worked, the tire becomes bare so that the smaller grooves cannot be formed in the groove walls).

In the tire based on this aspect, there is provided a region where the smaller grooves are absent in the vicinity of the tread surface. It is possible to provide the mold which can mold the tire having the optimum smaller grooves.

BRIEF DESCRIPTION OF THE DRAWINGS

FIG. 3 is an enlarged perspective view of a riblet.

FIG. 4 is an enlarged perspective view of pointed projections.

FIG. 6 is an enlarged perspective view of the tread of a tire according to the third embodiment.

FIG. 7 is an enlarged perspective view of the tread of a tire according to the fourth embodiment.

FIG. 10 is a perspective view of a groove of a tire according to still another embodiment.

FIG. 14 is a top plan view of a tread of a tire according to a seventh embodiment.

FIG. 19 is an enlarged perspective view of a tread of a tire according to the twelfth embodiment.

FIG. 23 is a top plan view of a tread of a tire of Example 1.

DESCRIPTION OF THE PREFERRED EMBODIMENTS

First Embodiment

A first embodiment of the tire of the invention will be described with reference to FIGS. 1 to 4.

Figure 2:
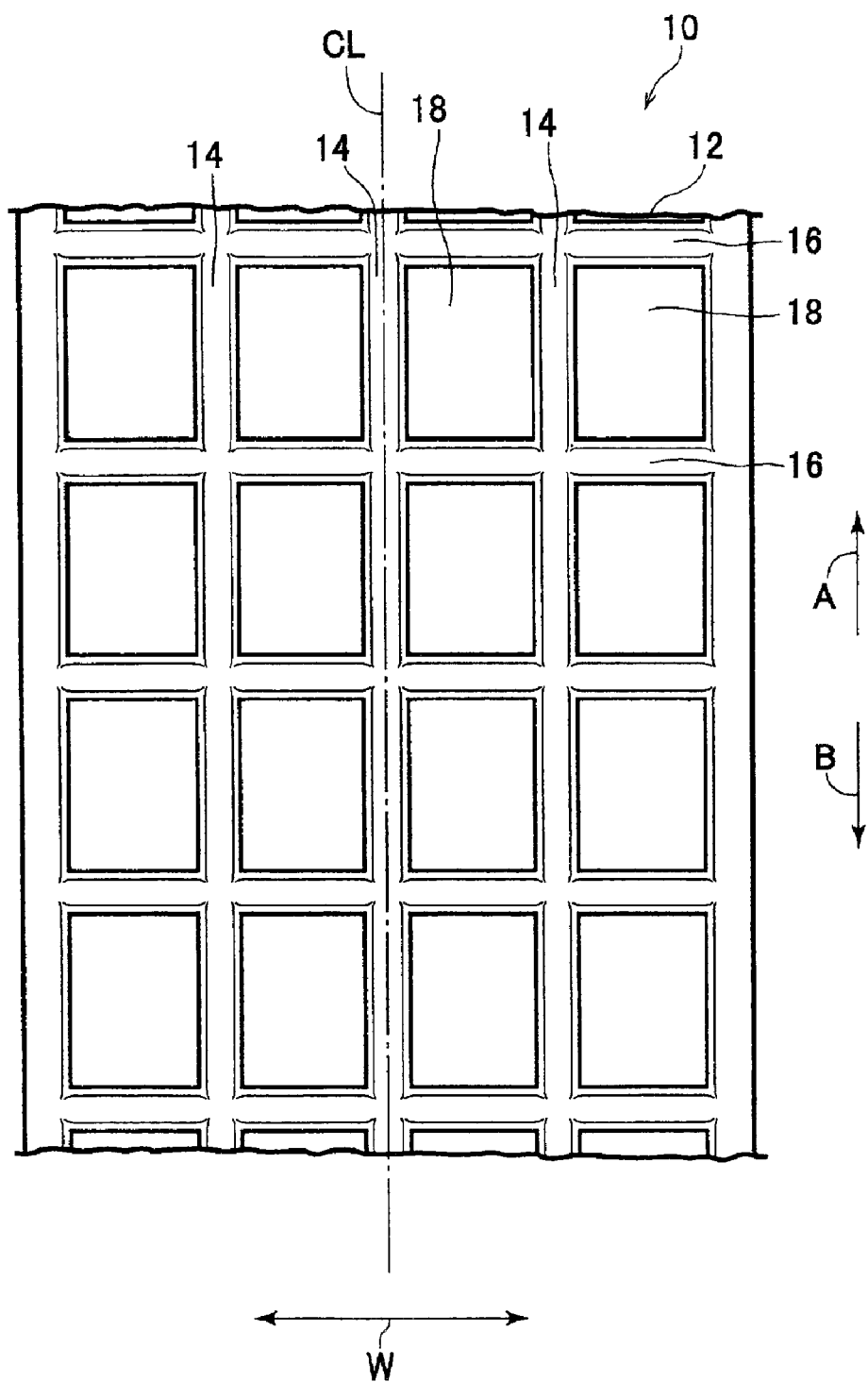
FIG. 2 is a top plan view of the tread of the tire.

As shown in FIG. 2, a tire 10 is provided at its tread 12 with a plurality of blocks 18 which are defined by a plurality of circumferential grooves 14 extending in the tire circumferential directions (i.e., in the direction of arrow A and in the direction of arrow B) and a plurality of transverse grooves 16 intersecting those circumferential grooves 14.

The tire 10 of this embodiment has an internal structure identical to that of the normal (pneumatic) tire so that the description on the internal structure will be omitted. Here, the tire 10 of this embodiment is a pneumatic tire but could be applied to a tire (e.g., a solid rubber tire) other than the pneumatic tire.

Figure 1:
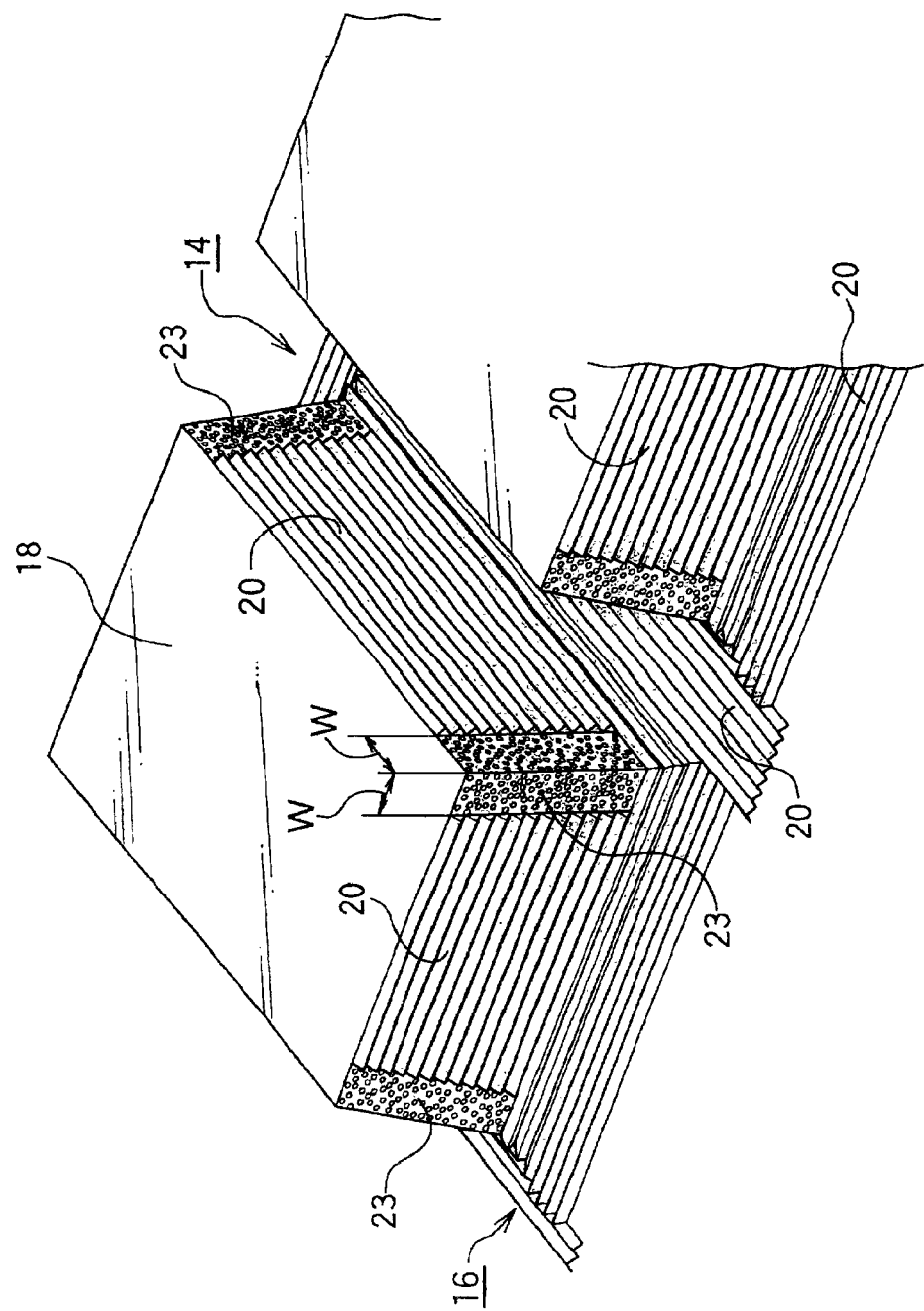
FIG. 1 is an enlarged perspective view of the tread of a tire according to the first embodiment.

As shown in FIG. 1, riblets 20 are formed individually on the side and bottom walls of each circumferential groove 14 and on the side and bottom walls of each transverse groove 16.

In the riblets 20 of this embodiment, as shown in FIG. 3, smaller grooves 22, which are extended in the longitudinal directions of the groove (i.e., the circumferential groove 14 or the transverse groove 16) while presenting a triangular section, are formed consecutively in the transverse directions (i.e., in the widthwise directions of the smaller grooves 22).

Where the smaller grooves 22 have the triangular sectional shape, they are preferably formed into a shape transversely symmetric with respect to a normal S extending through the widthwise center of each smaller groove 22 and normal to the groove wall, i.e., into an isosceles triangle.

It is further preferable that the depth D and the pitch P of the smaller grooves 22 satisfy a relation of $P \leq 2D$.

It is preferable that those smaller grooves 22 have the depth groove D set within a range of 0.01 to 0.5 mm and the pitch P set within the range of 0.01 to 0.5 mm, and it is further preferable that the groove depth D is set within a range of 0.05 to 0.4 mm whereas the pitch P is set within the range of 0.05 to 0.4 mm.

On the other hand, the intersecting portion between the circumferential groove 14 and the transverse groove 16 provides a predetermined width W as a turbulence generating zone 23, which is provided at random with a number of pointed projections 24, as shown in FIG. 4. Here, the width W is preferred to be 1 mm or more.

The pointed projection 24 of this embodiment has a bulging spherical shape (i.e., a portion of a sphere) and is preferred to have a diameter d1 set within the range of 0.01 to 0.5 mm and a height H set within the range of 0.01 to 0.5 mm.

Here, the ratio of the pointed projections 24 in the unit area of the aforementioned zone is preferred to be 30% or more.

(Actions)

In the tire 10 of this embodiment, the circumferential groove 14 and the transverse groove 16 are provided with the smaller grooves 22, which have the groove depth D set within the range of 0.01 to 0.5 mm, at the pitch P within the range of 0.01 to 0.5 mm, so that the resistance to the water to flow in the grooves is reduced to improve the drainage efficiency of the grooves.

On the other hand, the separation of the water flow in the vicinity of the confluence between the circumferential groove 14 and the transverse groove 16 is suppressed by the numerous pointed projections 24 which are formed on the groove sides in the vicinity of the confluence.

As a result, it is possible to improve the wet performance of the tire 10 better than the prior art.

It is especially preferable for improving the drainage efficiency of the smaller grooves 22 to set the groove depth D within the range of 0.05 to 0.4 mm and the pitch P within the range of 0.05 to 0.4 mm.

Second Embodiment

A tire according to a second embodiment of the invention will be described with reference to FIG. 5. Here is omitted the description of the same components as those of the foregoing embodiment by designating the components by the common reference numerals.

Figure 5:
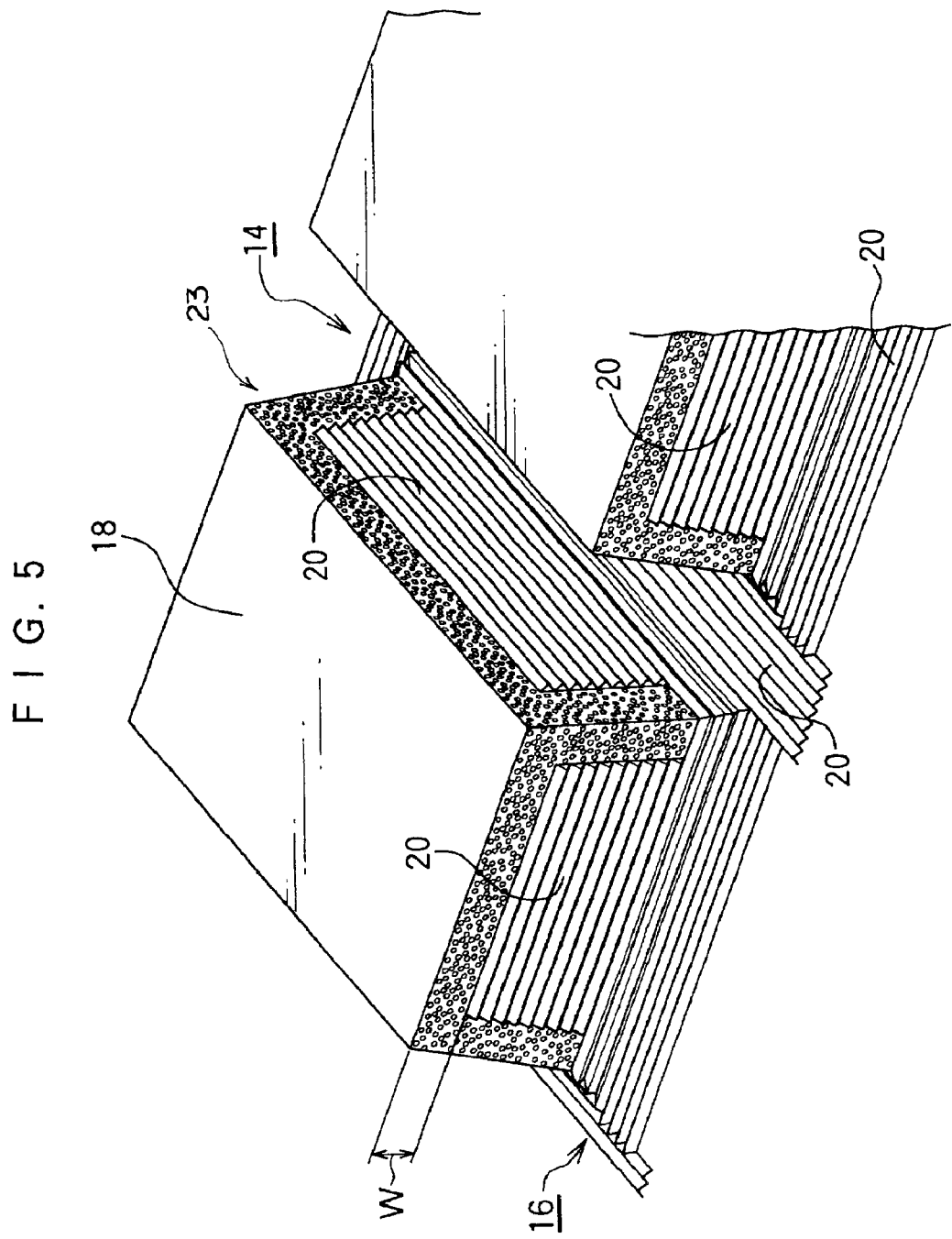
FIG. 5 is an enlarged perspective view of the tread of a tire according to the second embodiment.

In the tire 10 of this embodiment, the turbulence generating zone 23 is provided at the groove sides on the tread surface side of the predetermined width W, as shown in FIG. 5, in addition to the confluence between the circumferential groove 14 and the transverse groove 16.

(Actions)

When the tire 10 runs on a wet road surface so that the water on the road surface comes through the openings in the tread into the circumferential groove 14 and the transverse groove 16, turbulent flows are established in the water flowing in the vicinities of the grooves sides by the numerous pointed projections 24 near the openings. As a result, the separation of the coming water can be suppressed to allow the water on the road to flow with a lower resistance into the grooves.

As a result, it is possible to improve the wet performance of the tire 10, as newly used.

Third Embodiment

A tire according to a third embodiment of the invention will be described with reference to FIG. 6. Here is omitted the description of the same components as those of the foregoing embodiments by designating the components by the common reference numerals.

The tread pattern of the tire 10 of this embodiment is a rib pattern so that the tread 12 is provided exclusively with the circumferential grooves 14 having the riblets 20, as shown in FIG. 6.

In the tire 10 of this embodiment, the resistance experienced at the circumferential grooves 14 can be reduced as in the foregoing embodiments so that the wet performance can be improved better than the tire of the rib pattern of the prior art.

Fourth Embodiment

A tire according to a fourth embodiment of the invention will be described with reference to FIG. 7. Here is omitted the description of the same components as those of the foregoing embodiments by designating the components by the common reference numerals.

The tread pattern of the tire 10 of this embodiment is a rib pattern as in the third embodiment so that the tread 12 is provided exclusively with the circumferential grooves 14 having the riblets 20 and the pointed projections 24, as shown in FIG. 7.

In the tire 10 of this embodiment, the numerous pointed projections 24 are formed on the groove sides in the vicinities of the openings on the tread surface side, so that the water on the tread can easily come from the openings to improve the wet performance better than the third embodiment.

Other Embodiments

Figure 8:
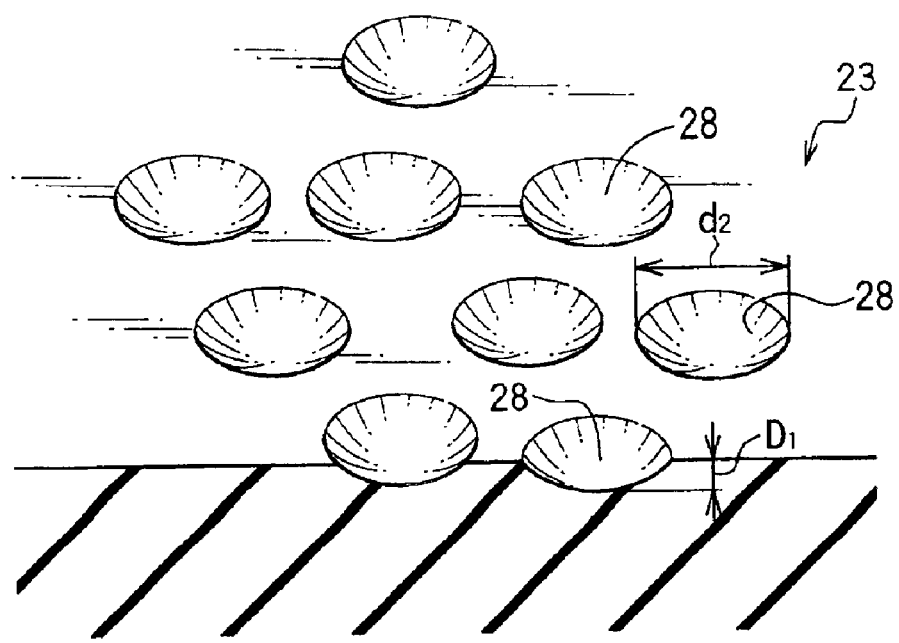
FIG. 8 is an enlarged perspective view of recesses.

Here, in the foregoing embodiments, in order to suppress the separation of the water flow, the numerous pointed projections 24 are formed on the groove sides to establish the turbulent flows. However, the invention should not be limited thereto, but the pointed projections 24 can be replaced by a number of small recesses 28, as shown in FIG. 8. In this modification, too, it is possible to achieve the actions and effects similar to those of the case in which the numerous pointed projections 24 are formed.

Here, the recesses 28 shown in FIG. 8 are formed into a recessed spherical shape having a diameter d2 set within the range of 0.01 to 0.5 mm and a depth D1 set within the range of 0.01 to 0.5 mm. The recesses 28 preferably take up 30% or more of the surface area.

In the foregoing embodiment, the pointed projections 24 have the bulging spherical shape. However, the invention should not be limited thereto but may be formed into another shape such as a triangular pyramid shape.

On the other hand, the recesses 28 should not be limited to the recessed spherical shape but may be formed into another shape.

In the riblets 20 of the foregoing embodiments, moreover, the smaller grooves 22 having the triangular section are formed continuously in the transverse directions, but more or less spacings may be formed between the smaller grooves 22 and the smaller grooves 22 if the effect to reducing the resistance to the water flow is retained.

Here, the riblets 20 have been described to be formed by arranging the numerous smaller grooves 22 but may be exemplified by a number of rib-shaped projections (or ridges) juxtaposed to each other. In this modification, the spacings between the rib-shaped projections and the rib-shaped projections correspond to the smaller grooves 22.

Figure 9:
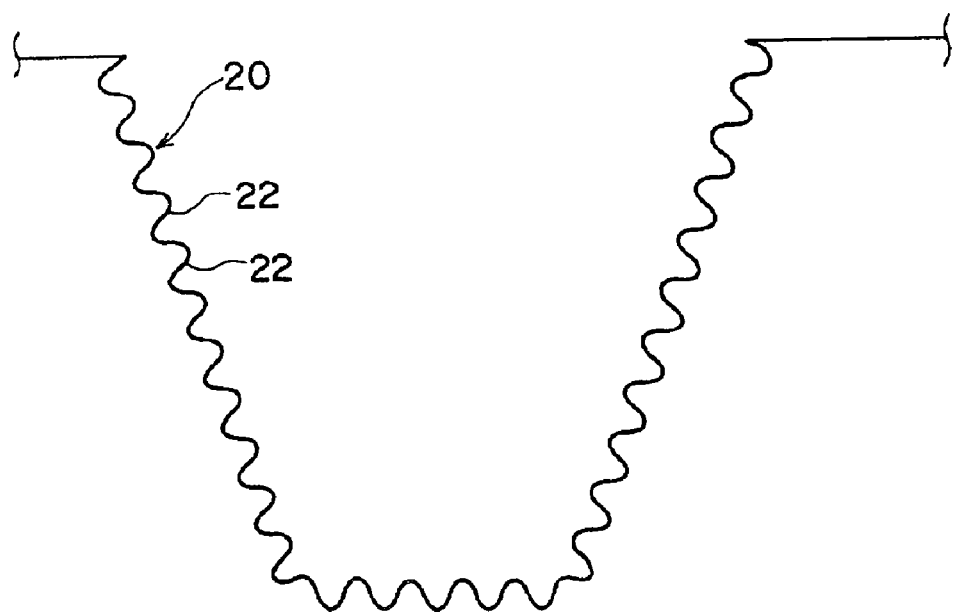
FIG. 9 is a sectional diagram of a groove of a tire according to another embodiment.

In the foregoing embodiments, the smaller grooves 22 have the triangular sectional shape but may be replaced by another shape such as a rectangular, trapezoidal or semicircular shape if they have the effect to reduce the resistance to the water flow. As shown in FIG. 9, for example, the smaller grooves 22 may be so continuously juxtaposed that the crests and valleys are smoothly continued to form sinusoidal undulations on the groove wall surfaces. With these undulations on the groove wall surfaces, the mold can be easily worked on its surface and is excellent in the durability of the smaller groove forming portions.

Where the groove bottoms are cracked, on the other hand, the cracks may grow along the smaller grooves 22. Where the growth of the cracks in the groove bottoms is likely to be caused by the smaller grooves 22, these smaller grooves 22 need not be formed in the portion near the groove bottom (i.e., the portion of the size of 10% of the groove depth d from the bottom).

Fifth Embodiment

A tire according to a fifth embodiment of the invention will be described with reference to FIG. 11. Here is omitted the description of the same components as those of the foregoing embodiments by designating the components by the common reference numerals.

Figure 11:
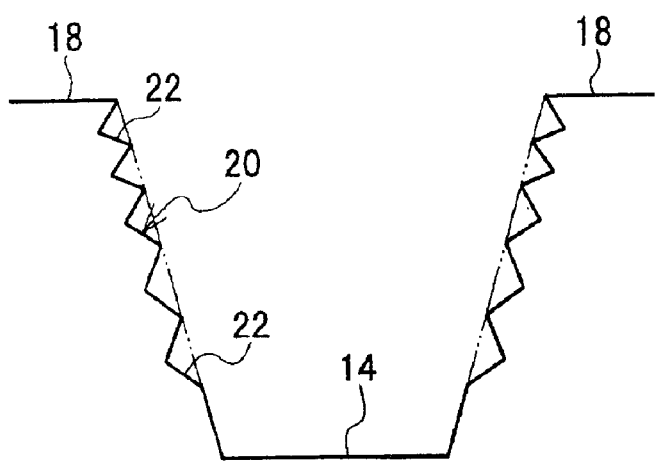
FIG. 11 is a longitudinally right-angled sectional diagram of a groove according to the fifth embodiment.

In the tire 10 of this embodiment, as shown in FIG. 11, the circumferential groove 14 is provided in its side faces (also the transverse groove 16 is provided in its side faces, although not shown in the drawings) with a plurality of smaller grooves 22 which are juxtaposed with a triangular section to extend in the longitudinal directions, as in the foregoing embodiments. However, the smaller grooves 22 have pitches enlarged gradually from the tread surface to the bottom of the circumferential groove 14.

[Actions]

As the tread 12 is worn the more, the circumferential groove 14 (and the transverse groove 16) becomes the shallower.

As the groove becomes the shallower, the flow in the groove takes the smaller Reynolds number to make it the harder to establish minute turbulences along the groove walls. In this embodiment, however, the pitches of the smaller grooves 22 are made the larger as the circumferential groove 14 becomes the shallower. With the smaller Reynolds number, therefore, the minute turbulences can be generated along the groove walls to keep the resistance to the flow low. This discussion likewise applies to the transverse groove 16.

Even after the wear, therefore, it is possible to keep a high anti-hydroplaning.

Sixth Embodiment

A tire according to a sixth embodiment of the invention will be described with reference to FIG. 12. Here is omitted the description of the same components as those of the foregoing embodiments by designating the components by the common reference numerals.

Figure 12:
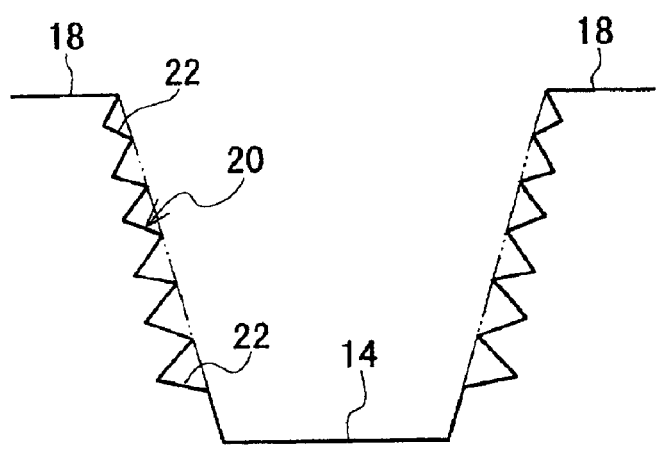
FIG. 12 is a longitudinally right-angled sectional diagram of a groove according to the sixth embodiment.

In the tire 10 of this embodiment, as shown in FIG. 12, the circumferential groove 14 is provided in its side faces (also the transverse groove 16 is provided in its side faces, although not shown in the drawings) with a plurality of smaller grooves 22 which extend with a triangular section in the longitudinal directions, as in the foregoing embodiments. However, the smaller grooves 22 have depths enlarged gradually from the tread surface to the bottom of the circumferential groove 14.

[Actions]

As the tread 12 is worn the more, the circumferential groove 14 (and the transverse groove 16) becomes the shallower.

As the groove becomes the shallower, the flow in the groove takes the smaller Reynolds number to make it the harder to establish minute turbulences along the groove walls. In this embodiment, however, the depths of the smaller grooves 22 are made the larger as the circumferential groove 14 becomes the shallower. With the smaller Reynolds number, therefore, the minute turbulences can be generated along the groove walls to keep the resistance to the flow low. This discussion likewise applies to the transverse groove 16.

Even after the wear, therefore, it is possible to keep a high anti-hydroplaning.

Figure 13:
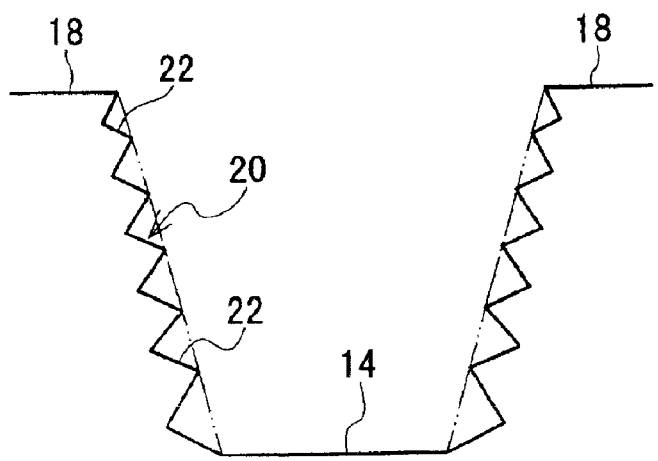
FIG. 13 is a longitudinally right-angled sectional diagram of a groove according to a modification of the sixth embodiment.

Here, the smaller grooves 22 may have their pitches and their depths enlarged the more from the tread surface to the bottom of the circumferential groove 14 (also the transverse groove 16), as shown in FIG. 13. In this case, too, even as the small Reynolds number becomes small, the minute turbulences can be generated along the groove walls to keep the resistance to the flow low.

Seventh Embodiment

A tire according to a seventh embodiment of the invention will be described with reference to FIG. 14. Here is omitted the description of the same components as those of the foregoing embodiments by designating the components by the common reference numerals.

As shown in FIG. 14, the tire 10 of this embodiment is provided at its tread 12 with: circumferential grooves 40 on the two sides of a tire equatorial plane CL; and circumferential grooves 42 on the outer sides of the tire widthwise directions of the circumferential grooves 40.

The tread 12 is further provided with: transverse grooves 44 which are formed in plurality in the tire circumferential directions on the tire widthwise direction outer sides of the circumferential grooves 42 and at a slight inclination with respect to the tire widthwise directions; and transverse grooves 46 which are formed in plurality in the tire circumferential directions between the circumferential grooves 40 and the circumferential grooves 42 and at an inclination with respect to the tire widthwise directions.

Here: the land portions defined by the circumferential grooves 42 and the transverse grooves 44 will be called the shoulder blocks 48; the land portions defined by the circumferential grooves 40, the circumferential grooves 42 and the transverse grooves 46 will be called the second blocks 50; and the land portion defined by the circumferential grooves 40 and the circumferential grooves 40 will be called the center rib 52.

In the groove walls of each shoulder block 48 on the side of the circumferential groove 42, there are provided a plurality of smaller grooves 22 (although not shown in FIG. 14) which are formed in the groove depth direction excepting the portions confronting the transverse grooves 46 and extended in their longitudinal directions.

In the groove walls of the second block 50 on the sides of the circumferential groove 42 and the circumferential groove 40, there are provided a plurality of smaller grooves 22 (although not shown in FIG. 14) which are formed in the groove depth direction and extended in their longitudinal directions.

In the side walls of the center rib 52 on the sides of the circumferential grooves 40, there are provided a plurality of smaller grooves 22 (although not shown in FIG. 14) which are formed in the groove depth direction excepting the portions confronting the transverse grooves 46 and which are individually extended in their longitudinal directions.

Here, the second blocks 50 are classified into second blocks 50L which are longer in the tire circumferential directions, and a second blocks 50S which are shorter in the tire circumferential directions. The shoulder blocks 48 are classified into shoulder blocks 48L which are longer in the tire circumferential directions, and a shoulder blocks 48S which are shorter in the tire circumferential directions.

Here are compared the wall of the circumferential groove 40 of the second block 50L and the wall of the circumferential groove 40 of the second block 50S. In the wall of the circumferential groove 40 of the second block 50S, the smaller grooves 22 are set to have a larger pitch and a larger depth.

Here are likewise compared the wall of the circumferential groove 42 of the second block 50L and the wall of the circumferential groove 42 of the second block 50S. In the wall of the circumferential groove 42 of the second block 50S, the smaller grooves 22 are set to have a larger pitch and a larger depth.

In the wall of the circumferential groove 42 of the shoulder block 48L, there are compared the portion confronting the second block 50L having the larger size in the tire circumferential directions and the portion confronting the second block 50S having the smaller size in the tire circumferential directions. In the portion confronting the second block 50S having the smaller size in the tire circumferential directions, the smaller grooves 22 are set to have a larger pitch and a larger depth.

In the wall of the circumferential groove 42 of the shoulder block 48L of this embodiment, the smaller grooves 22 are so formed in the portion confronting the second block 50L having the larger size in the tire circumferential directions as to have a pitch and a depth similar to those of the smaller grooves 22 formed in the wall of the confronting second block 50L, and the smaller grooves 22 are so formed in the portion confronting the second block 50S having the small size in the tire circumferential directions as to have a pitch and a depth similar to those of the smaller grooves 22 formed in the wall of the confronting second block 50S.

In the wall of the circumferential groove 40 of the center rib 52, on the other hand, the smaller grooves 22 are so formed in the portion confronting the second block 50L having the larger size in the tire circumferential directions as to have a pitch and a depth similar to those of the smaller grooves 22 formed in the wall of the confronting second block 50L, and the smaller grooves 22 are so formed in the portion confronting the second block 50S having the small size in the tire circumferential directions as to have a pitch and a depth similar to those of the smaller grooves 22 formed in the wall of the confronting second block 50S.

(Actions)

In the wall of the circumferential groove 40 of the center rib 52, according to this embodiment: at the portion confronting the second block 50L having the larger size in the circumferential directions, the smaller grooves 22 are formed to have a pitch and a depth equalized to those of the smaller grooves 22 formed in the wall of the circumferential groove 40 of the second block 50L; and at the portion confronting the second block 50S having the smaller size in the circumferential directions, the smaller grooves 22 are formed to have a pitch and a depth equalized to those of the smaller grooves 22 formed in the wall of the circumferential groove 40 of the second block 50S. Therefore, the resistance to the fluid can be reduced to the optimum in any of the walls of the circumferential grooves 40. In the walls of the circumferential grooves 40 of the center rib 52, moreover, the smaller grooves 22 are not formed at the portions confronting the transverse grooves 46 so that no large disturbance is generated in the flow at the portions joining in the transverse grooves 46.

Therefore, the resistance to the fluid can be reduced to the optimum all over the length of the circumferential grooves 40.

Alternatively, the smaller grooves continuing in the circumferential direction may be formed with constant pitch and depth at the groove wall portions of the circumferential grooves 40 on the center rib 52 side. When the hydroplaning is occurring at a high speed, the water flows substantially in the circumferential direction in the vicinity of the center rib 52, regardless of the presence/absence of the transverse groove 46. Therefore, the aforementioned alternative structure having the circumferentially-continuous small grooves will also exhibit sufficiently good performances. Here, the pitch of the smaller groove is preferably the average of the pitches of the second blocks 50S and 50L, and the depth of the smaller groove is preferably the average of the depths of the second blocks 50S and 50L.

In the wall of the circumferential groove 42 of the shoulder block 48L and in the wall of the circumferential groove 42 of the shoulder block 48S, on the other hand: at the portions confronting the second block 50L having the larger size in the circumferential directions, the smaller grooves 22 are formed to have a pitch and a depth equalized to those of the smaller grooves 22 formed in the wall of the circumferential groove 40 of the second block 50L; and at the portions confronting the second block 50S having the smaller size in the circumferential directions, the smaller grooves 22 are formed to have a pitch and a depth equalized to those of the smaller grooves 22 formed in the wall of the circumferential groove 40 of the second block 50S. Therefore, the resistance to the fluid can be reduced to the optimum in any of the walls of the circumferential grooves 42.

In the wall of the circumferential groove 40 of the shoulder block 48L and in the wall of the circumferential groove 40 of the shoulder block 48S, moreover, the smaller grooves 22 are not formed at the portions confronting the transverse grooves 46 so that no large disturbance is generated in the flow at the portions joining in the transverse grooves 46.

Therefore, the resistance to the fluid can be reduced to the optimum all over the length of the circumferential grooves 42

Eighth Embodiment

A tire according to an eighth embodiment of the invention will be described with reference to FIG. 15. Here is omitted the description of the same components as those of the foregoing embodiments by designating the components by the common reference numerals.

Figure 15:
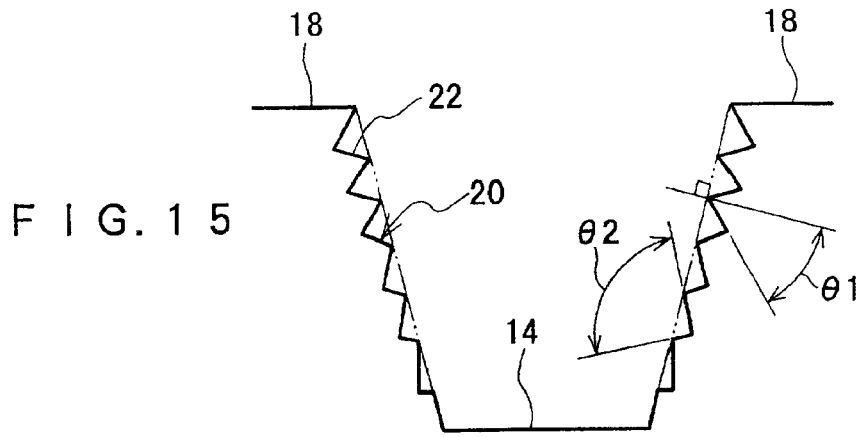
FIG. 15 is a longitudinally right-angled sectional diagram of a groove according to the eighth embodiment.

In this embodiment, as shown in FIG. 15, a first groove wall of the smaller groove 22 on the tread surface side is assumed to have an angle of inclination $\theta 1$ with respect to a line normal to the wall of the circumferential groove 14 where the smaller groove is formed. Then, the inclination angle $\theta 1$ is set larger on the first groove wall of the smaller groove 22 formed on the bottom side of the circumferential groove 14 than on the first wall of the smaller groove 22 formed on the tread surface side.

On the other hand, an angle $\theta 2$, as contained between the second wall of the smaller groove 22 on the bottom side of the circumferential groove 14 and the aforementioned first wall, is set larger of the smaller groove 22 formed in the bottom side of the circumferential groove 14 than of the smaller groove 22 formed in the tread surface side.

Here, the smaller grooves 22 in the remaining grooves are likewise set, although not shown in the drawings.
(Actions)

Here will be described the actions of this tire 10.

In this embodiment, the inclination angle $\theta 1$ of the first (groove) wall of the smaller groove 22 formed in the circumferential groove 14 on the bottom side is set larger than the inclination angle $\theta 1$ of the first wall of the smaller groove 22 formed on the tread surface side, the angle $\theta 2$ of the smaller groove 22 formed in the circumferential groove 14 on the bottom side is set larger than the angle $\theta 2$ of the smaller groove 22 formed in the tread surface side. When the tire 10 is to be extracted from the vulcanizing mold (not shown in the drawings), therefore, the tire 10 can be easily removed with the smaller grooves 22 being hardly caught, and the groove walls can be prevented from being damaged.

Ninth Embodiment

A tire according to a ninth embodiment of the invention will be described with reference to FIG. 16. Here is omitted the description of the same components as those of the foregoing embodiments by designating the components by the common reference numerals.

Figure 16:
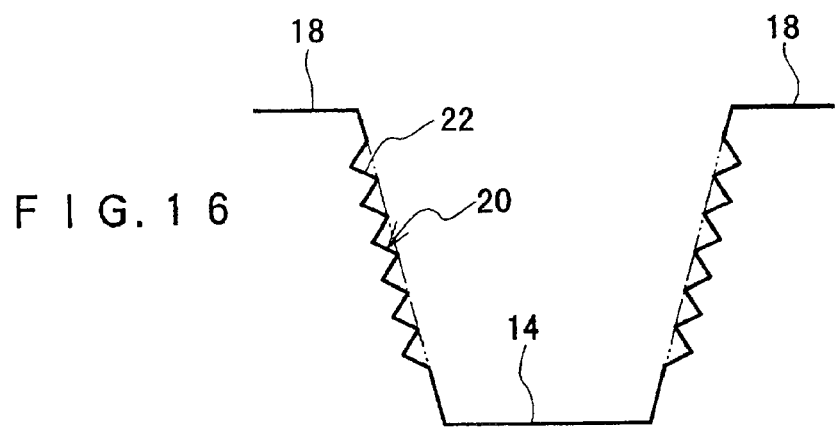
FIG. 16 is a longitudinally right-angled sectional diagram of a groove according to the ninth embodiment.

In this embodiment, as shown in FIG. 16, the smaller grooves 22 are nor formed in the vicinity of the tread surface of the circumferential groove 14 (and other grooves, although not shown in the drawings).

Therefore, the mold for the tire 10 can be easily worked accurately and precisely in the vicinity of the open ends of the grooves thereby to prevent the vicinity of the groove open end from becoming bare at the vulcanizing time.

Tenth Embodiment

A tire according to a tenth embodiment of the invention will be described with reference to FIG. 17. Here is omitted the description of the same components as those of the foregoing embodiments by designating the components by the common reference numerals.

Figure 17:
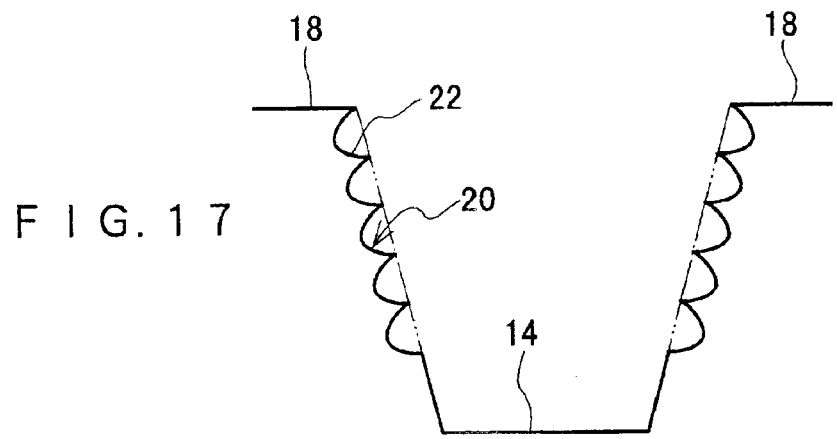
FIG. 17 is a longitudinally right-angled sectional diagram of a groove according to a tenth embodiment.

As shown in FIG. 17, the smaller grooves 22 of this embodiment are shaped to have a generally arcuate bottom shape, and the rib-shaped portion between the smaller grooves 22 is shaped to have an acute angle less than 90 degrees at its crest.

As a result, the rib-shaped portion between the smaller grooves 22 is made more rigid at its root but less rigid at its crest so that the rib-shaped portion can be easily deformed and prevented from being damaged when the tire is extracted from the vulcanizing mold.

Eleventh Embodiment

A tire according to an eleventh embodiment of the invention will be described with reference to FIG. 18. Here is omitted the description of the same components as those of the foregoing embodiments by designating the components by the common reference numerals.

Figure 18:
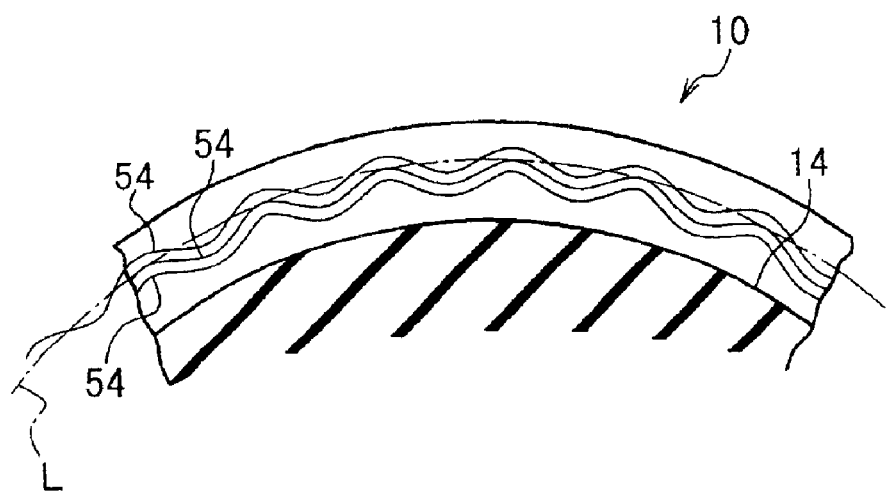
FIG. 18 is an enlarged sectional diagram taken along the longitudinal direction of a circumferential groove of a tire according to the eleventh embodiment.

In this embodiment, as shown in FIG. 18, smaller grooves 54 to be formed in the walls of the circumferential groove 14 are formed in parallel in the depthwise direction and are undulated (in a sinusoidal curve) to have an amplitude with respect to a reference line L parallel to the tread surface.

Here, the smaller grooves 54 are preferably set to have a period within a range of 2 to 60 mm and am amplitude within a range of 0.1 to 3 mm.

In the tire 10 of this embodiment, the smaller grooves 54 are undulated in the circumferential groove 14 so that their directions can match the various turbulent flows on the tread surface on the undulating road surface such as the asphalt-paved road thereby to effectively reduce the resistance to the flow in the groove.

Twelfth Embodiment

A tire according to a twelfth embodiment of the invention will be described with reference to FIG. 19. Here is omitted the description of the same components as those of the foregoing embodiments by designating the components by the common reference numerals.

In the tire 10 of this embodiment, as shown in FIG. 19, a plurality of smaller grooves 56 of a finite length are formed in the wall of the circumferential groove 14.

The smaller grooves 22 and the smaller grooves 54 of the foregoing embodiments are formed long along the longitudinal directions but may be divided to a certain length as in the smaller grooves 56 of this embodiment.

On the other hand, the smaller grooves 56 may be arranged regularly or at random. In this case, the smaller grooves 56 are preferred to have a length of 5 mm or more for generating minute turbulences along the groove walls.

In order to generate these minute turbulences along the groove walls, on the other hand, the spacing (or the arrangement density) of the smaller grooves 56 is preferably determined by experiments or simulations considering the groove length and other factors.

Thirteenth Embodiment

A tire according to a thirteenth embodiment of the invention will be described with reference to FIGS. 20 to 22. Here is omitted the description of the same components as those of the foregoing embodiments by designating the components by the common reference numerals.

Figure 20:
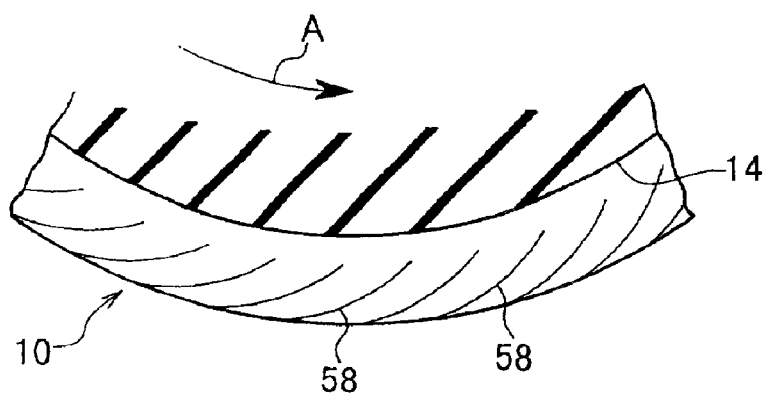
FIG. 20 is an enlarged sectional diagram taken along the longitudinal direction of a circumferential groove of a tire according to the thirteenth embodiment.
Figure 21:
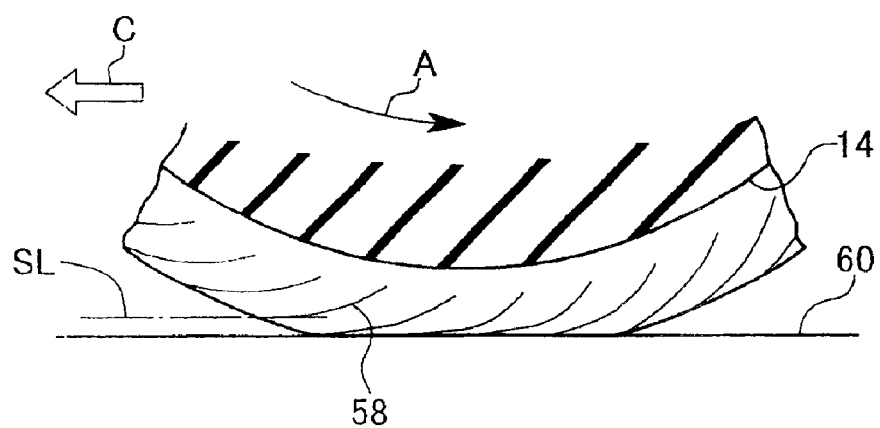
FIG. 21 is an enlarged sectional diagram taken along the longitudinal direction of the circumferential groove when the tire according to the thirteenth embodiment is contacting a road surface.

In the tire 10 of this embodiment, as shown in FIG. 20, the circumferential groove 14 is provided in its wall with smaller grooves 58 which are formed in plurality in the tire circumferential directions and which are so inclined with respect to the tread surface that they may be spaced the more from the tread surface in the turning direction (as indicated by arrow A) of the tire.

Figure 22:
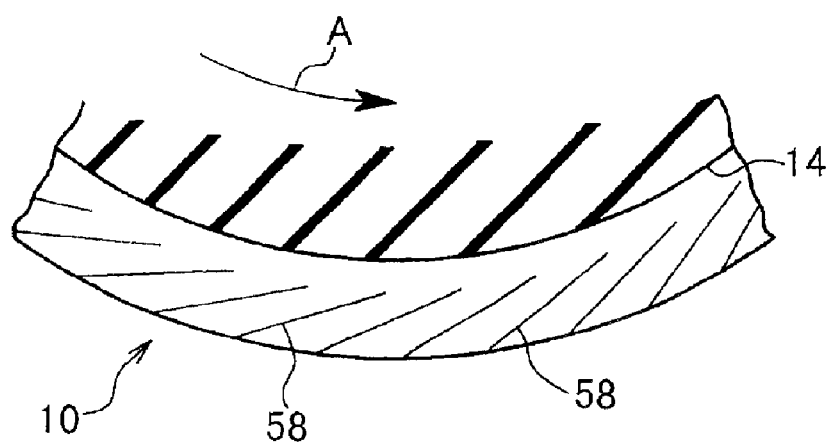
FIG. 22 is an enlarged sectional diagram taken along the longitudinal direction of a circumferential groove of a tire according to a modification of the thirteenth embodiment.

The smaller grooves 58 of this embodiment are arcuately curved but may be linear, as shown in FIG. 22.

Here in the region of the grounding face on the side in the tire advancing direction (as indicated by arrow C) and within a height of 5 mm from a road surface 60, a tangent SL of the end portion of the smaller groove 58 on the tread surface is preferred to be parallel to the road surface 60.

In the tire 10 of this embodiment, the tangent of the end portion of the smaller groove 58 on the side of the tread surface is parallel to the road surface 60 just before the tire 10 treads (in the region within the height of 5 mm from the road surface) so that the drainage of the circumferential groove 14 at the treading time is improved.

On the other hand, those smaller grooves 58 are so inclined with respect to the tread surface that they are spaced the more from the tread surface in the turning direction (i.e., in the direction of arrow A) of the tire. Therefore, the directions of the smaller grooves 58 can match the water flow thereby to improve the drainage at the treading time.

When the water flow is to be reversed, the inclination direction of the smaller grooves 58 may be reversed.

Fourteenth Embodiment

A tire according to a fourteenth embodiment of the invention will be described with reference to FIG. 31. Here is omitted the description of the same components as those of the foregoing embodiments by designating the components by the common reference numerals.

Figure 31:
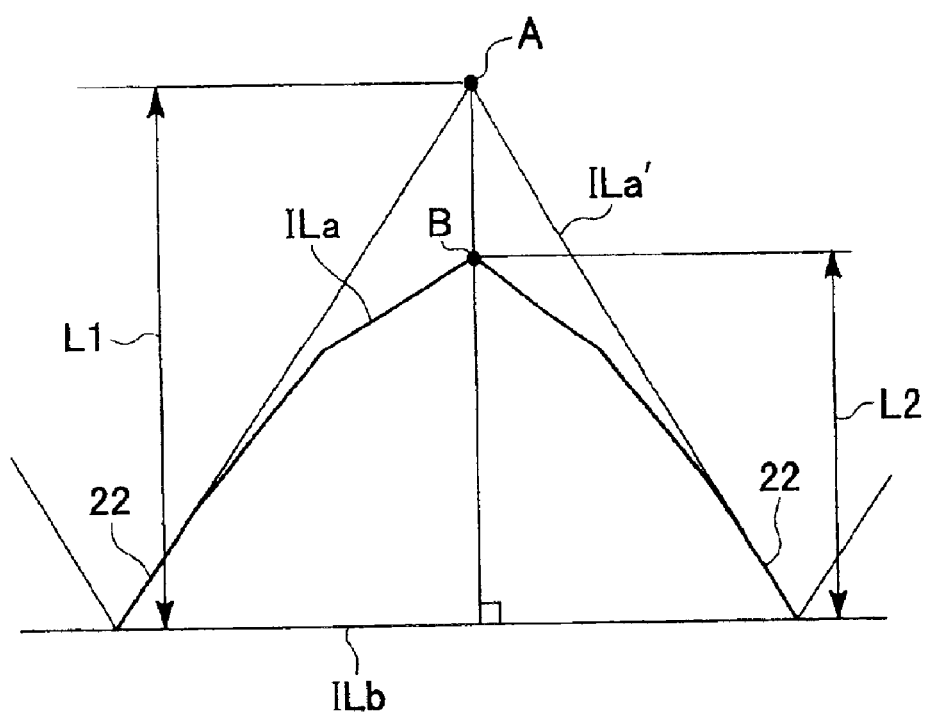
FIG. 31 is an enlarged sectional diagram of a groove wall of a tire (or tires of Embodiments 1 to 4 of Example 10) according to a fourteenth embodiment and taken at a right angle with respect to the longitudinal direction of smaller grooves.

When the rib-shaped portion formed between the smaller grooves 22 is viewed in a section normal to the longitudinal directions of the smaller grooves 22, as shown in FIG. 31: the intersection between a prolongation ILa of the wall face of one smaller groove 22 on the bottom side thereof and a prolongation ILa' of the wall face of the other smaller groove 22 on the bottom side thereof is designated by point A; the intersection between the wall face of the rib-shaped portion of the one smaller groove 22 on the crest side thereof and the wall face of the rib-shaped portion of the other smaller groove 22 on the crest side thereof is designated by point B; the distance from a virtual line ILb joining the bottom of the one smaller groove 22 and the bottom of the other smaller groove 22 to the point A is designated by L1; and the distance from the virtual line ILb to the point B is designated by L2. With these designations, it is preferable to set $L2 \geq 0.6\, L1$.

By forming the smaller grooves 22 in the groove wall, minute vortexes having an axes in the flow direction are generated so that the resistance of the groove wall is reduced as the vortexes leave the groove wall. If the rib-shaped portion between the smaller groove 22 and the smaller groove 22 has a sharp crest, the portions where the generated vortexes contact are the small region near the crest rib-shaped portion so that the resistance to the water flow can be reduced.

Here, if the crest of the rib-shaped portion is rounded or flattened, the area where the generated vortexes contact may be enlarged to make it impossible to reduce the resistance to the water flow. However, the resistance to the water flow can be reduced without fail by satisfying the relations of $L2 \geq 0.6\, L1$.

TEST EXAMPLE 1

In order to confirm the effects of the invention, there were prepared a plurality of tires of a size PSR205/55R16 to compare the anti-hydroplaning performances.

Here will be described the test tires.

All the following test tires is provided with a pattern having a center rib 30, second ribs 32 and blocks 34, as shown in FIG. 23.

Here: the center rib 30 has a width W1 of 15 mm; the second ribs 32 have a width W2 of 25 mm; the blocks 34 have a size L1 of 25 mm in the tire circumferential directions and a size W3 of 30 mm in the wire widthwise directions; and the center rib 30, the second ribs 32 and the blocks 34 individually have a height (or groove depth) of 8 mm. On the other hand, the second ribs 32 are provided with transverse grooves 36 which are formed on the tire widthwise direction outer side thereof in plurality in the tire circumferential direction and at a pitch P=25 mm and which have a length L2 of 15 mm, a width W4 of 5 mm.

Figure 24:
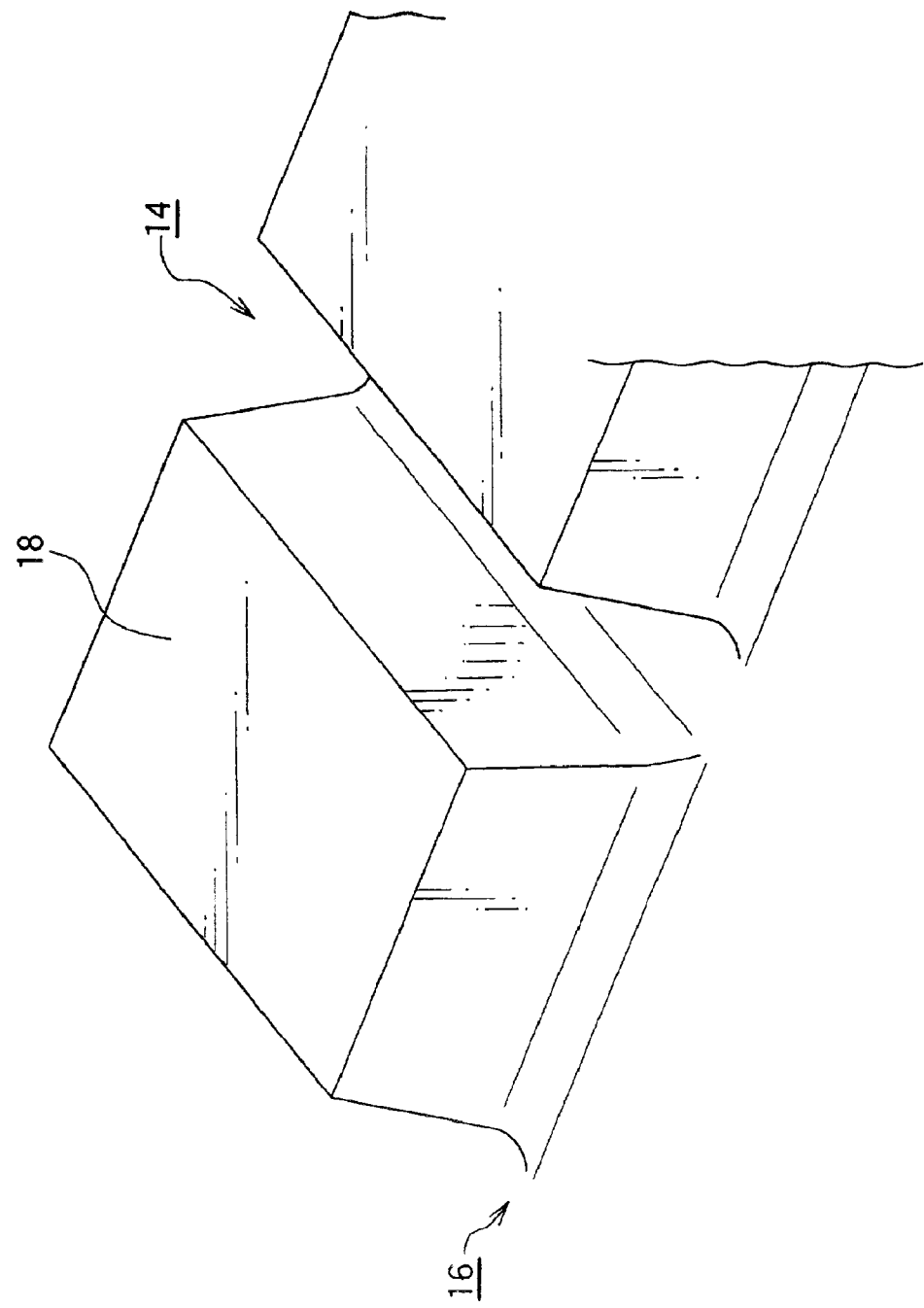
FIG. 24 is an enlarged perspective view of a tread having a groove freed of any riblets on its walls.

Tire a: The tire (i.e., the ordinary tire of the prior art) which is worked to have smooth groove side faces and bottom face, as shown in FIG. 24.

Figure 25:
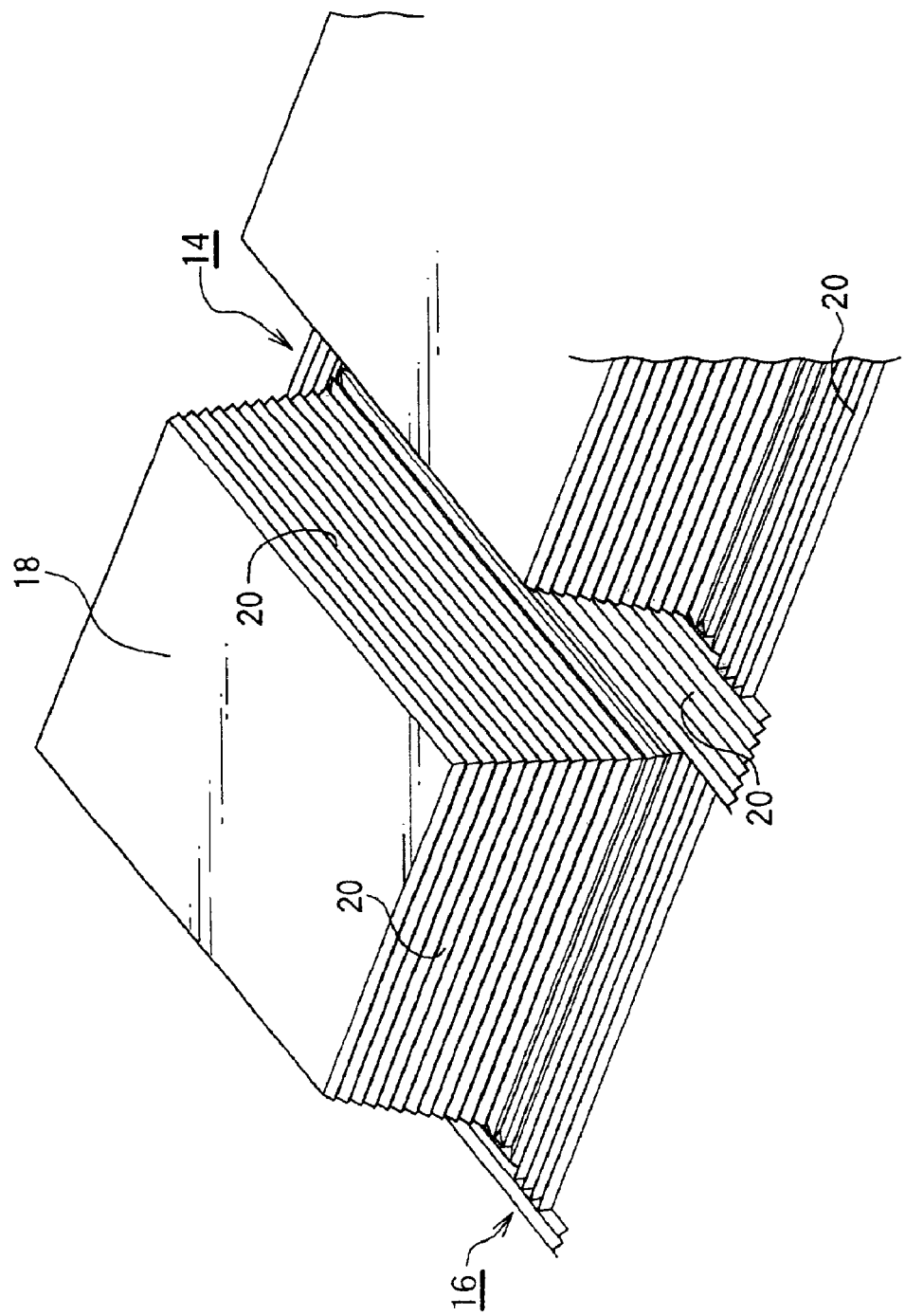
FIG. 25 is an enlarged perspective view of a tread having a groove provided with riblets on its walls.

Tires b to i and k: The tires in which the riblets 20 are formed in all the groove side faces and the bottom face, as shown in FIG. 25, and in which the depth D and the pitch P of the smaller grooves 22 are set to have the following sizes, as enumerated in the following Table 1.

Tire j: The tire in which the riblets 20 are formed exclusively in the groove side faces, as shown in FIG. 10, and in which the depth D and the pitch P of the smaller grooves 22 are set to have the following sizes, as enumerated in the following Table 1. Here, the grooves are made smooth from the bottom (i.e., the deepest portion) to 10% of the depth.

Tire l: The tire in which the groove walls are corrugated, as shown in FIG. 9. The depth D and the pitch P are enumerated in the following Table 1. Here, the crests of the corrugations have a radius of curvature R of 0.1 mm or less.

Figure 26:
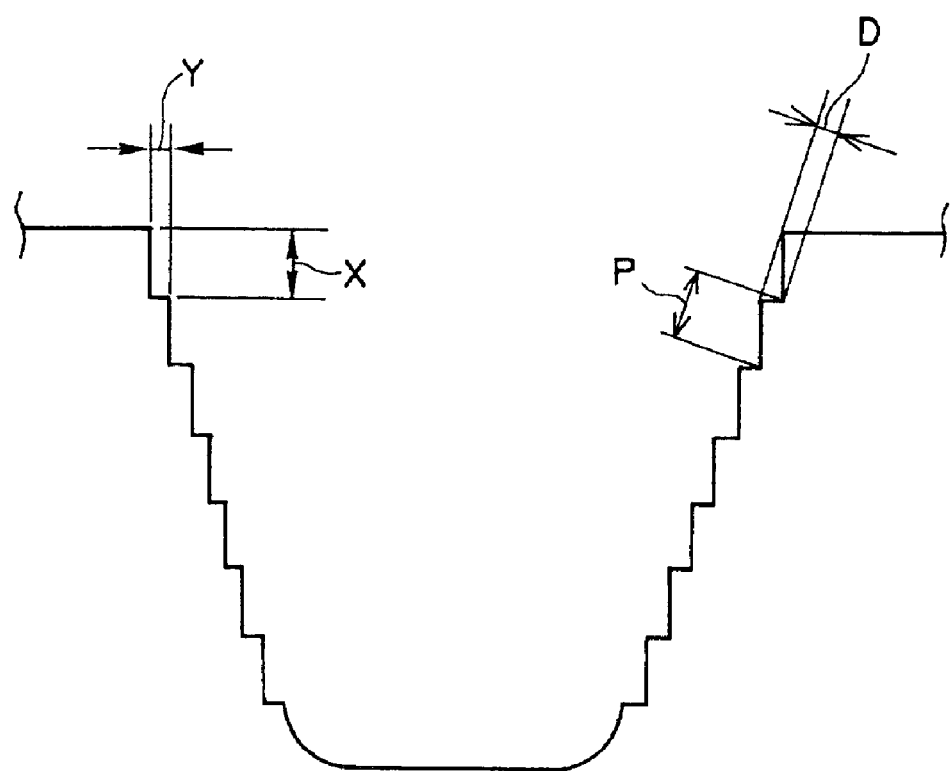
FIG. 26 is an enlarged perspective view of a tread having a groove provided with stepped walls.

Tires m to q: The tires in which the groove side faces are stepped (that is, the longitudinal faces along the tire diametrical directions and the transverse faces in parallel with the tread face are alternately arranged), as shown in FIG. 26. The steps have a width Y and a height X (i.e., the depth D and the pitch P by the measuring method according to the invention) set to have the sizes, as enumerated in the following Table 1.

Tire r: The tire in which the smaller grooves 22 are formed exclusively in the wall faces in the circumferential groove (i.e., in the groove wall faces continuing in the tire circumferential directions) to be arranged between the center rib 30 and the second ribs 32 but not in the remaining groove wall faces (e.g., in the wall faces in the circumferential grooves between the second ribs 32 and the blocks 34 and in the wall faces in the transverse grooves). The depth D and the pitch P of the smaller grooves 22 are set to have the following sizes, as enumerated in the following 1.

Testing Methods: The test tires were assembled with the rims of 6.5JJ-16 under the internal pressure of 220 KPa and were attached to a passenger car. This car was tested for accelerations in a pool of a depth of 10 mm from a speed of 50 Km/h. The hydroplaning occurrence rates were evaluated by the test driver.

The evaluations were determined in terms of the hydroplaning occurrence rates and were exponentially expressed by setting the tire a to 100. It is expressed that the larger numerical value indicates the higher hydroplaning occurrence rate and the more excellent wet performance.

TABLE 1

| | 22 (Triangle) | | 22 (Stepped) | | Wet Perf. |
|---|---|---|---|---|---|
| | D (mm) | P (mm) | Y (mm) | X (mm) | (Exponent) |
| Tire a | | | | | 100 |
| Tire b | 0.3 | 0.3 | | | 110 |
| Tire c | 0.3 | 0.4 | | | 105 |
| Tire d | 0.3 | 0.5 | | | 100 |
| Tire e | 0.3 | 0.6 | | | 92 |
| Tire f | 0.2 | 0.3 | | | 115 |
| Tire g | 0.4 | 0.3 | | | 105 |
| Tire h | 0.5 | 0.3 | | | 100 |
| Tire i | 0.6 | 0.3 | | | 94 |
| Tire j | 0.3 | 0.3 | | | 107 |
| Tire k | 0.4 | 0.4 | | | 101 |
| Tire l | 0.3 | 0.3 | | | 107 |
| Tire m | 0.125 | 0.48 | 0.13 | 0.46 | 104 |
| Tire n | 0.166 | 0.50 | 0.18 | 0.46 | 102 |
| Tire o | 0.198 | 0.51 | 0.22 | 0.46 | 98 |
| Tire p | 0.160 | 0.440 | 0.18 | 0.4 | 106 |

TABLE 1-continued

| | 22 (Triangle) | | 22 (Stepped) | | Wet Perf. |
|---|---|---|---|---|---|
| | D (mm) | P (mm) | Y (mm) | X (mm) | (Exponent) |
| Tire q | 0.170 | 0.63 | 0.18 | 0.6 | 96 |
| Tire r | 0.3 | 0.3 | | | 103 |

TEST EXAMPLE 2

In order to confirm the effects of the invention, there were prepared two kinds of Comparative Example tires of a size PSR185/70R14 and four kinds of Example tires according to the present invention to compare the anti-hydroplaning performances.

Here will be described the test tires.

All the test tires have the block pattern shown in FIG. 2, and the blocks 18 have a size of 30 mm in the tire circumferential directions, a size of 30 mm in the tire widthwise directions and a height (or a groove depth) of 8 mm.

Tire of Comparative Example 1: The tire (i.e., the ordinary tire of the prior art) which is worked to have smooth side faces and bottom face of the circumferential groove 14 and the transverse groove 16, as shown in FIG. 24.

Tire of Example 1: The tire in which the riblets 20 are formed in all the groove side faces and the bottom face, as shown in FIG. 25, and in which the smaller grooves 22 have a depth D of 0.05 mm and a pitch P of 0.05 mm.

Tire of Example 2: The tire having the groove wall shape shown in FIG. 1. The recesses 28 having the diameter d2 of 1.2 mm and the depth D1 of 0.2 mm are arranged at random (e.g., the density: 35%) in the turbulence generating zone 23 having the width of 5 mm of the groove side faces in the vicinity of the confluence between the circumferential groove 14 and the transverse groove 16. The smaller grooves 22 are identical to those of Example 1.

Figure 27:
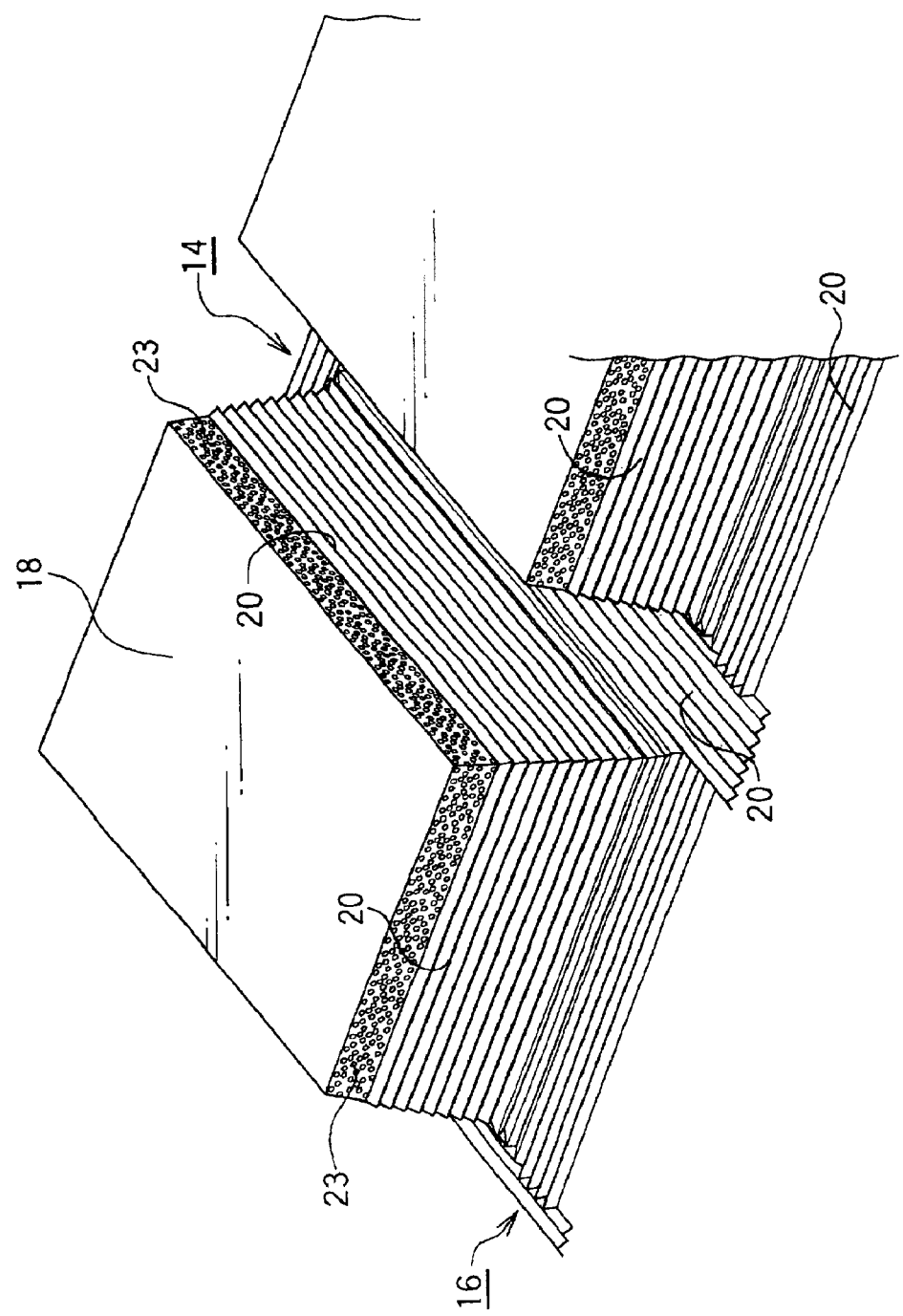
FIG. 27 is an enlarged perspective view of a tread which is provided with turbulence generating zones exclusively in the vicinity of an opening on the tread surface side and grooves having riblets in the remaining portions.

Tire of Example 3: The tire having the groove wall shape shown in FIG. 27. The recesses 28 having the diameter d2 of 0.2 mm and the depth D1 of 0.04 mm are arranged at random (e.g., the density: 40%) in the turbulence generating zone 23 having the width of 1 mm of the groove side faces in the vicinity of the opening on the side of the tread surface. The smaller grooves 22 are identical to those of Example 1.

Tire of Example 4: The tire having the groove wall shape shown in FIG. 5. The recesses 28 having the diameter d2 of 1.2 mm and the depth D1 of 0.2 mm are arranged at random (e.g., the density: 30%) in the turbulence generating zone 23 having the width of 5 mm of the groove side faces in the vicinity of the confluence between the circumferential groove 14 and the transverse groove 16. The recesses 28 having the diameter d2 of 0.2 mm and the depth D1 of 0.04 mm are arranged at random (e.g., the density: 35%) in the turbulence generating zone 23 having the width of 1 mm in the vicinity of the groove side faces of the opening on the tread surface side. The smaller grooves are identical to those of Example 1.

Tire of Comparative Example 2: The tire in which the riblets 20 are formed on all the groove side faces and the bottom face. However, the smaller grooves 22 have the depth D of 1.0 mm and the pitch P of 1.0 mm.

Testing Methods: The test tires were assembled with the rims of 5J-14 under the internal pressure of 2.0 Kgf/cm$^2$ (200 kPa) and were attached to a passenger car. This car was driven to run into the pool of the depth of 10 mm at various speeds. The hydroplaning occurrence rates were evaluated by the test driver.

The evaluations were determined in terms of the hydroplaning occurrence rates and were exponentially expressed by setting the tire of Comparative Example 1 to 100. It is expressed that the larger numerical value indicates the higher hydroplaning occurrence rate and the more excellent wet performance.

TABLE 2

|  | Wet Perf. |
| --- | --- |
| Com. Example 1 | 100 |
| Example 1 | 105 |
| Example 2 | 109 |
| Example 3 | 108 |
| Example 4 | 111 |
| Com. Example 2 | 95 |

TEST EXAMPLE 3

In order to confirm the effects of the invention, there were prepared two kinds of Comparative Example tires of a size PSR235/45R17 and four kinds of Example tires according to the present invention to compare the anti-hydroplaning performances.

Here will be described the test tires.

Figure 28:
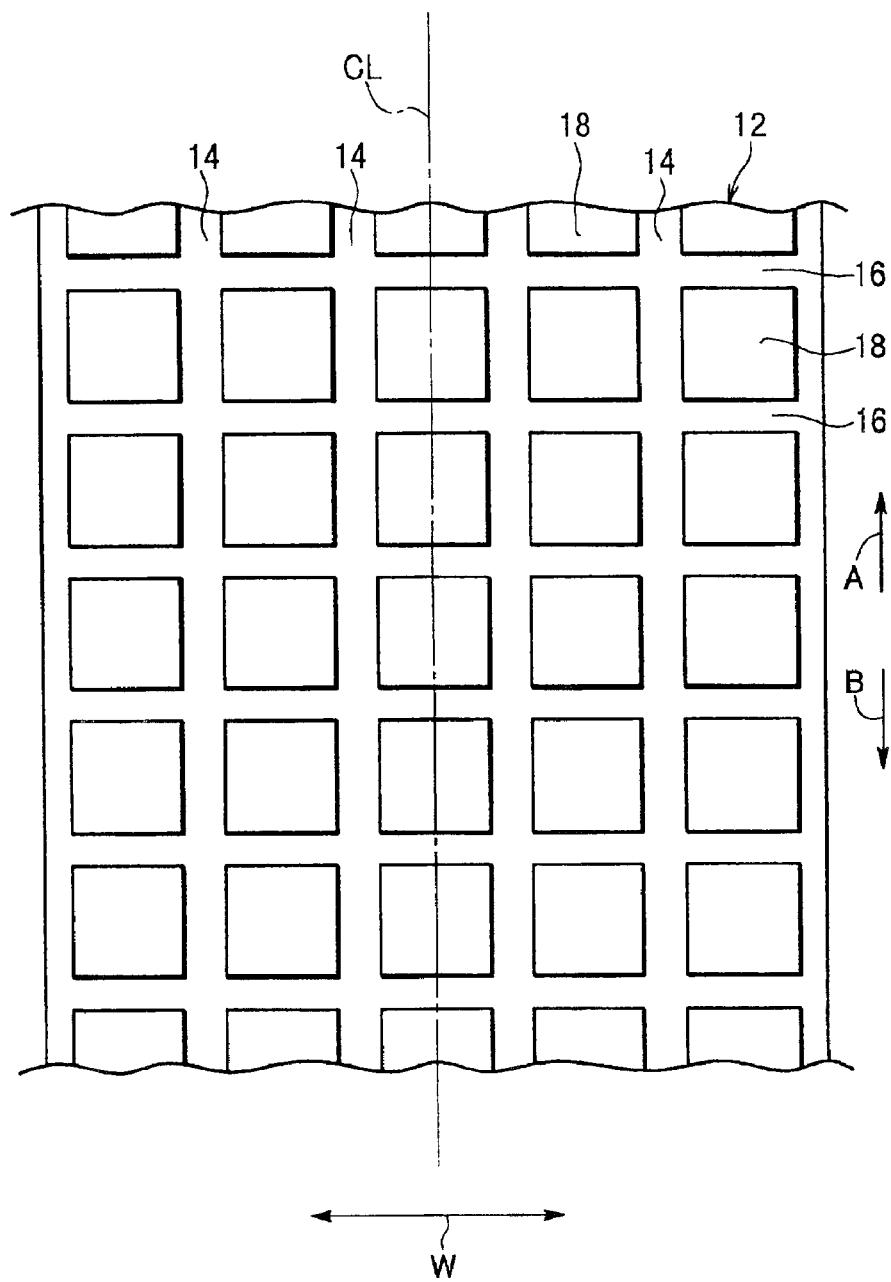
FIG. 28 is a top plan view of a tread and shows a block pattern of tires of Examples 3 and 4.

All the test tires have the block pattern shown in FIG. 28, and the blocks 18 have a size of 35 mm in the tire circumferential directions, a size of 30 mm in the tire widthwise directions and a height (or a groove depth) of 8 mm.

Tire of Comparative Example 1: The tire (i.e., the ordinary tire of the prior art) which is worked to have smooth side faces and bottom face of the circumferential groove 14 and the transverse groove 16, as shown in FIG. 24.

Tire of Example 1: The tire in which the riblets 20 are formed in all the groove side faces and the bottom face, as shown in FIG. 25, and in which the smaller grooves 22 have a depth D of 0.1 mm and a pitch P of 0.1 mm.

Tire of Example 2: The tire having the groove wall shape shown in FIG. 1. The recesses 28 having the diameter d2 of 0.14 mm and the depth D1 of 0.15 mm are arranged at random (e.g., the density: 30%) in the turbulence generating zone 23 having the width of 5 mm of the groove side faces in the vicinity of the confluence between the circumferential groove 14 and the transverse groove 16. The smaller grooves 22 are identical to those of Example 1.

Tire of Example 3: The tire having the groove wall shape shown in FIG. 27. The recesses 28 having the diameter d2 of 0.4 mm and the depth D1 of 0.08 mm are arranged at random (e.g., the density: 35%) in the turbulence generating zone 23 having the width of 1 mm of the groove side faces in the vicinity of the opening on the side of the tread surface. The smaller grooves 22 are identical to those of Example 1.

Tire of Example 4: The tire having the groove wall shape shown in FIG. 5. The recesses 28 having the diameter d2 of 1.4 mm and the depth D1 of 0.15 mm are arranged at random (e.g., the density: 40%) in the turbulence generating zone 23 having the width of 5 mm of the groove side faces in the vicinity of the confluence between the circumferential groove 14 and the transverse groove 16. The recesses 28 having the diameter d2 of 0.4 mm and the depth D1 of 0.08 mm are arranged at random (e.g., the density: 45%) in the turbulence generating zone 23 having a width of 1 mm on the groove side faces in the vicinity of the opening on the tread surface side. The smaller grooves are identical to those of Example 1.

Tire of Comparative Example 2: The tire in which the riblets 20 are formed on all the groove side faces and the bottom face. However, the smaller grooves 22 have the depth D of 1.0 mm and the pitch of 1.0 mm.

Testing Methods: The test tires were assembled with the rims of 8JJ-17 under the internal pressure of 2.2 Kgf/cm2 (220 kPa) and were attached to a passenger car. This car was driven to run into the pool of the depth of 10 mm with a curve having a radius of 130 m at various speeds. The hydroplaning occurrence rates were evaluated by the test driver.

The evaluations were determined in terms of the hydroplaning occurrence rates and were exponentially expressed by setting the tire of Comparative Example 1 to 100. It is expressed that the larger numerical value indicates the higher hydroplaning occurrence rate and the more excellent wet performance.

TABLE 3

|  | Wet Perf. |
| --- | --- |
| Com. Example 1 | 100 |
| Example 1 | 105 |
| Example 2 | 110 |
| Example 3 | 109 |
| Example 4 | 114 |
| Com. Example 2 | 93 |

TEST EXAMPLE 4

In order to confirm the effects of the invention, there were prepared two kinds of Comparative Example tires of a size TBR295/70R22.5 and four kinds of Example tires according to the present invention to compare the wet braking performances.

Here will be described the test tires.

All the test tires have the block pattern shown in FIG. 28, and the blocks 18 have a size of 35 mm in the tire circumferential directions, a size of 30 mm in the tire widthwise directions and a height (or a groove depth) of 12 mm.

Tire of Comparative Example 1: The tire (i.e., the ordinary tire of the prior art) which is worked to have smooth side faces and bottom face of the circumferential groove 14 and the transverse groove 16, as shown in FIG. 24.

Tire of Example 1: The tire in which the riblets 20 are formed in all the groove side faces and the bottom face, as shown in FIG. 25, and in which the smaller grooves 22 have a depth D of 0.1 mm and a pitch P of 0.1 mm.

Tire of Example 2: The tire having the groove wall shape shown in FIG. 1. The recesses 28 having the diameter d2 of 0.14 mm and the depth D1 of 0.15 mm are arranged at random (e.g., the density: 40%) in the turbulence generating zone 23 having the width of 5 mm of the groove side faces in the vicinity of the confluence between the circumferential groove 14 and the transverse groove 16. The smaller grooves 22 are identical to those of Example 1.

Tire of Example 3: The tire having the groove wall shape shown in FIG. 27. The recesses 28 having the diameter d2 of 0.4 mm and the depth D1 of 0.08 mm are arranged at random (e.g., the density: 45%) in the turbulence generating zone 23 having the width of 1 mm of the groove side faces in the vicinity of the opening on the side of the tread surface. The smaller grooves 22 are identical to those of Example 1.

Tire of Example 4: The tire having the groove wall shape shown in FIG. 5. The recesses 28 having the diameter d2 of 1.4 mm and the depth D1 of 0.15 mm are arranged at random (e.g. the density: 50%) in the turbulence generating zone 23 having the width of 5 mm of the groove side faces in the vicinity of the confluence between the circumferential groove 14 and the transverse groove 16. The recesses 28 having the diameter d2 of 0.4 mm and the depth D1 of 0.08 mm are arranged at random (e.g., the density: 40%) in the turbulence generating zone 23 having a width of 1 mm on the groove side faces in the vicinity of the opening on the tread surface side. The smaller grooves are identical to those of Example 1.

Tire of Comparative Example 2: The tire in which the riblets 20 are formed on all the groove side faces and the bottom face. However, the smaller grooves 22 have the depth D of 1.0 mm and the pitch P of 1.0 mm.

Testing Methods: The test tires were assembled with the rims of 9.00 under the internal pressure of 9.0 Kgf/cm$^2$ (900 kPa) and were attached to a motor truck. This motor truck was driven to run at a speed of 80 Km/h into the pool of the depth of 10 mm. The braking stop distances were evaluated by the test driver.

The evaluations were determined by measuring the braking stop distances and were exponentially expressed by setting the tire of Comparative Example 1 to 100. It is expressed that the smaller numerical value indicates the shorter stop distance and the more excellent wet braking performance.

TABLE 4

|  | Wet Braking Perf. |
| --- | --- |
| Com. Example 1 | 100 |
| Example 1 | 96 |
| Example 2 | 94 |
| Example 3 | 95 |
| Example 4 | 93 |
| Com. Example 2 | 103 |

TEST EXAMPLE 5

In order to confirm the effects of the invention, there were prepared one kind of tire of the prior art of a size PSR225/50R16 and four kinds of Example tires according to the present invention to evaluate the hydroplaning occurrence rates.

Here will be described the test tires.

All the test tires have the pattern, as shown in FIG. 23, in which there are formed: a rib having the width of 30 mm on the tire equatorial (central) plane; ribs having the width of 35 mm with the transverse grooves formed therein, the ribs being provided on the outer sides of the rib having the width of 30 mm; and blocks having the width of 35 mm on the outer sides of the ribs having the width of 35 mm.

Tire of Prior Art Example: The tire having no smaller groove in the groove walls.

Tire of Example 1: The tire in which the smaller grooves having the depth of 0.3 mm are formed in the groove walls at the (constant) pitch of 0.3 mm over the region of 80% of the depth size from the tread surface side to the bottom (but neither in the bottom nor in the vicinity of the bottom).

Tire of Example 2: The tire in which the region having the smaller grooves is similar to that of Example 1 but the pitch of the smaller grooves changes from 0.3 mm in the vicinity of the tread surface to 0.5 mm in the vicinity of the groove bottom (the smaller grooves have a constant depth of 0.3 mm).

Tire of Example 3: The tire in which the region having the smaller grooves is similar to that of Example 1 but the depth of the smaller grooves changes from 0.3 mm in the vicinity of the tread surface to 0.5 mm in the vicinity of the groove bottom (the smaller grooves have a constant depth of 0.3 mm).

Tire of Example 4: The tire in which the region having the smaller grooves is similar to that of Example 1 but the pitch of the smaller grooves changes from 0.3 mm in the vicinity of the tread surface to 0.5 mm in the vicinity of the groove bottom and the depth of the smaller grooves changes from 0.3 mm in the vicinity of the tread surface to 0.5 mm in the vicinity of the groove bottom.

Testing Methods: The test tires were assembled with the rims of 7JJ-16 under the internal pressure of 220 KPa and were attached to a passenger car. This car was tested for accelerations in the pool of the depth of 10 mm from the speed of 50 Km/h. The hydroplaning occurrence rates were evaluated by the test driver. Here, the tests were performed for both the new tires and the worn tires (at the time of wear of 50%).

The evaluations were exponentially expressed by setting the tire of the Prior Art Example to 100. It is expressed that the larger numerical value indicates the higher hydroplaning occurrence rate and the more excellent anti-hydroplaning performance.

TABLE 5

|  | Anti-Hydroplaning Perf. (New) | Anti-Hydroplaning Perf. (Worn) |
| --- | --- | --- |
| Prior Art | 100 | 100 |
| Example 1 | 105 | 103 |
| Example 2 | 104 | 105 |
| Example 3 | 104 | 105 |
| Example 4 | 104 | 107 |

It has been found out from the test results that the tires of Examples 1 to 4 according to the invention retain the high anti-hydroplaning performances over the prior art even when worn.

TEST EXAMPLE 6

In order to confirm the effects of the invention, there were prepared one type of the prior art tire of a size PSR205/50R16 and five types of Example tires according to the present invention to evaluate the hydroplaning occurrence rates.

Here will be described the test tires.

All the test tires have the pattern, as shown in FIG. 23, in which there are formed: a rib having the width of 30 mm on the tire equatorial plane; ribs having the width of 35 mm with the transverse grooves formed therein, the ribs being provided on the outer sides of the rib having the width of 30 mm; and blocks having the width of 25 mm on the outer sides of the ribs having the width of 35 mm.

Tire of Prior Art Example: The tire having no smaller groove in the groove walls.

Tire of Example 1: The tire in which the smaller grooves having the triangular sectional shape of the width of 0.4 mm are formed in all the groove walls at the pitch of 0.4 mm in the groove depthwise direction.

Tire of Example 2: The tire in which: the smaller grooves having the triangular sectional shape of the depth of 0.3 mm are formed at the pitch of 0.3 mm in the depth direction in the groove walls of the side faces of the second ribs 32; the smaller grooves having the triangular sectional shape of the depth of 0.5 mm are formed at the pitch of 0.5 mm in the depth direction in the groove walls of the side faces of the blocks 34; and the smaller grooves having the triangular sectional shape of the depth of 0.4 mm are formed at the pitch of 0.4 mm in the depth direction in the other groove walls (of the transverse grooves).

Tire of Example 3: The tire in which: the smaller grooves having the triangular sectional shape of the depth of 0.3 mm are formed at the pitch of 0.3 mm in the depth direction in the groove walls of the side faces of the second ribs 32; the smaller grooves having the triangular sectional shape of the depth of 0.5 mm are formed at the pitch of 0.5 mm in the depth direction in the groove walls of the side faces of the blocks 34; the smaller grooves having the triangular sectional shape of the depth of 0.3 mm are formed at the pitch of 0.3 mm in the depth direction in the groove walls of the center rib 30; and the smaller grooves having the triangular sectional shape of the depth of 0.4 mm are formed at the pitch of 0.4 mm in the depth direction in the other groove walls (of the transverse grooves).

Tire of Example 4: The tire in which the smaller grooves having the triangular sectional shape of the depth of 0.4 mm are formed at the pitch of 0.4 mm in the depth direction at the confluences between the circumferential groove and the transverse groove in all the groove walls excepting the portions on the prolongation of the transverse groove.

Figure 30:
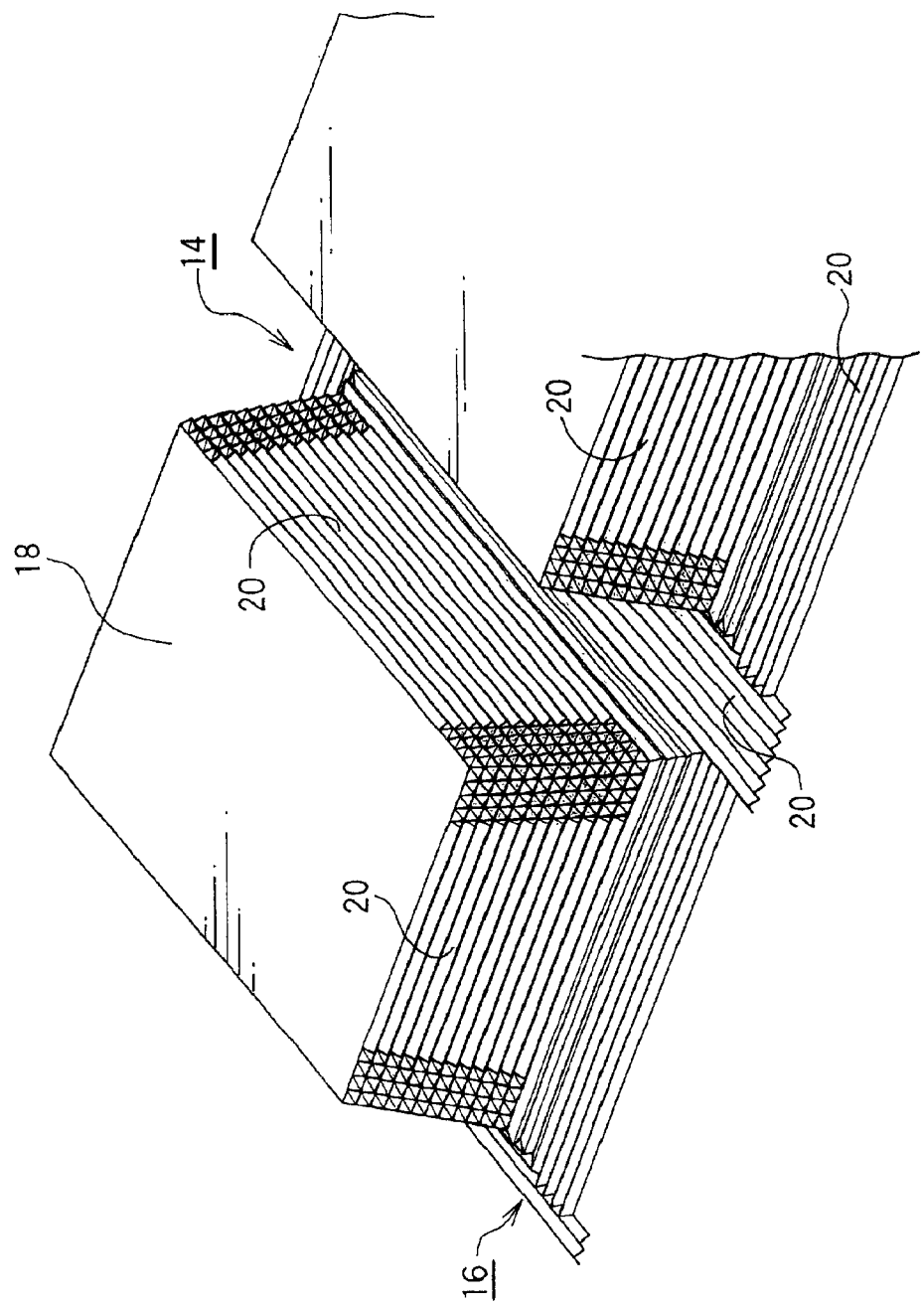
FIG. 30 is an enlarged perspective view of a tread of a tire of Embodiment 5 of Example 6.

Tire of Example 5: The tire in which: the smaller grooves having the triangular sectional shape of the depth of 0.4 mm are formed at the pitch of 0.4 mm in the depth direction in all the groove walls; and the smaller grooves having the triangular sectional shape of the depth of 0.4 mm are formed at the pitch of 0.4 mm in the groove 16, 14 longitudinal direction in the ranges of 4 mm from all the block corners, so that a number of dimples of pyramid-shaped projections are formed in the range of 4 mm from the block corners (as should be referred to FIG. 30).

Testing Methods: The test tires were assembled with the rims of 6.5JJ-16 under the internal pressure of 220 KPa and were attached to a passenger car. This car was tested for accelerations in the pool of the depth of 10 mm from the speed of 50 Km/h. The hydroplaning occurrence rates were evaluated by the test driver.

The evaluations were exponentially expressed by setting the tire of the Comparative Example to 100. It is expressed that the larger numerical value indicates the higher hydroplaning occurrence rate and the more excellent anti-hydroplaning performance.

TABLE 6

|  | Anti-Hydroplaning Perf. |
| --- | --- |
| Com. Example 1 | 100 |
| Example 1 | 105 |
| Example 2 | 107 |
| Example 3 | 108 |
| Example 4 | 107 |
| Example 5 | 107 |

It has been found out from the test results that the tires of Examples 1 to 5 according to the present invention exhibit the high anti-hydroplaning performances over the prior art.

TEST EXAMPLE 7

In order to confirm the effects of the invention, the vulcanizing tests were performed on the tire having the size of PSR205/55R16.

Here will be described the test tires.

All the test tires have the pattern, as shown in FIG. 23, in which there are formed: a rib having the width of 25 mm on the tire equatorial plane; ribs having the width of 35 mm with the transverse grooves formed therein, the ribs being provided on the outer sides of the rib having the width of 25 mm; and blocks having the width of 25 mm on the outer sides of the ribs having the width of 35 mm.

Tire of Prior Art Example: The tire having the smooth groove walls.

Tire of Example 1: The tire in which smaller grooves having a sectional shape of an isosceles triangle and having a depth of 0.4 mm are formed at a pitch of 0.4 mm in the depthwise direction in all the groove walls over the region of 80% of the depth size from the tread surface.

Tire of Example 2: The tire in which smaller grooves are formed in all the groove walls over the region of 80% of the depth size from the tread surface and have such a sectional shape of an isosceles triangle on the tread surface side as turns into a right-angled triangle (as referred to FIG. 15) as they come toward the groove bottom.

Here, the smaller grooves have the pitch of 0.4 mm.

Tire of Example 3: The tire in which smaller grooves having a sectional shape of an isosceles triangle and having a depth of 0.4 mm are formed at a pitch of 0.4 mm in the depthwise direction in all the groove walls excepting the portions of 1 mm from the road surface, over the region of 80% of the depth size from the tread surface.

Tire of Example 4: The tire in which smaller grooves having two side wall faces of a sectional shape of a generally parabolic shape and having a depth of 0.4 mm are formed at a pitch of 0.4 mm in the depthwise direction in all the groove walls over the region of 80% of the depth size from the tread surface (as referred to FIG. 17).

Testing Methods: Ten tires were vulcanized for the individual Examples. It was counted how many rib-shaped portions between the smaller grooves were broken or torn on the tire circumference and how many corner portions between the tread and the grooves were made bare.

TABLE 7

|  | Broken or Torn | Bare |
| --- | --- | --- |
| Prior Art | 0 | 0 |
| Example 1 | 10 | 10 |
| Example 2 | 0 | 10 |
| Example 3 | 10 | 0 |
| Example 4 | 0 | 20 |

TEST EXAMPLE 8

In order to confirm the effects of the invention, there were prepared one kind of tire of the prior art of a size PSR205/50R16, two kinds of tires of Comparative Examples and one kind of Example tire according to the present invention to evaluate the hydroplaning occurrence rates.

Here will be described the test tires.

All the test tires have the pattern, as shown in FIG. 23, in which there are formed: a rib having the width of 25 mm on the tire equatorial plane; ribs having the width of 35 mm with the transverse grooves formed therein, the ribs being provided on the outer sides of the rib having the width of 25 mm; and blocks having the width of 25 mm on the outer sides of the ribs having the width of 35 mm.

Tire of Prior Art Example: The tire having no smaller groove in the groove walls.

Tire of Comparative Example 1: The tire in which smaller grooves having a sinusoidal shape of the period of 1 mm and the amplitude of 5 mm are formed in the groove walls with reference to a line parallel to the tread surface. The smaller grooves have a sectional shape of a triangle and have the depth of 0.4 mm and the pitch of 0.4 mm.

Tire of Comparative Example 2: The tire in which smaller grooves having a sinusoidal shape of the period of 100 mm and the amplitude of 5 mm are formed with reference to a line parallel to the tread surface. The smaller grooves have a sectional shape of a triangle and have the depth of 0.4 mm and the pitch of 0.4 mm.

Tire of Example: The tire in which smaller grooves having a sinusoidal shape of the period of 10 mm and the amplitude of 2 mm are formed in the groove walls with reference to a line parallel to the tread surface. The smaller grooves have a sectional shape of a triangle and have the depth of 0.4 mm and the pitch of 0.4 mm.

Testing Methods: The test tires were assembled with the rims of 6.5JJ-16 under the internal pressure of 220 KPa and were attached to a passenger car. This car was tested for accelerations in the pool of the depth of 10 mm from the speed of 50 Km/h. The hydroplaning occurrence rates were evaluated by the test driver.

Here, the tests are performed on two kinds of pools, one of which is a concrete-paved road surface polished smooth and the other of which is an ordinary asphalt-paved road surface.

The evaluations were exponentially expressed by setting the tire of the Prior Art Example to 100. It is expressed that the larger numerical value indicates the higher hydroplaning occurrence rate and the more excellent anti-hydroplaning performance.

TABLE 8

|  | Anti-Hydroplaning Perf. (Concrete) | Anti-Hydroplaning Perf. (Asphalt) |
| --- | --- | --- |
| Prior Art | 100 | 100 |
| Com. Example 1 | 95 | 97 |
| Com. Example 2 | 97 | 98 |
| Example | 102 | 102 |

It has been found out from the test results that the tire of Example has high anti-hydroplaning performances for the smooth concrete-paved road surface and the rough asphalt-paved road surface.

TEST EXAMPLE 9

In order to confirm the effects of the invention, there were prepared one kind of tire of the prior art of the size PSR255/45R17 and two kinds of Example tires according to the present invention to evaluate the hydroplaning occurrence rates.

Here will be described the test tires.

Figure 29:
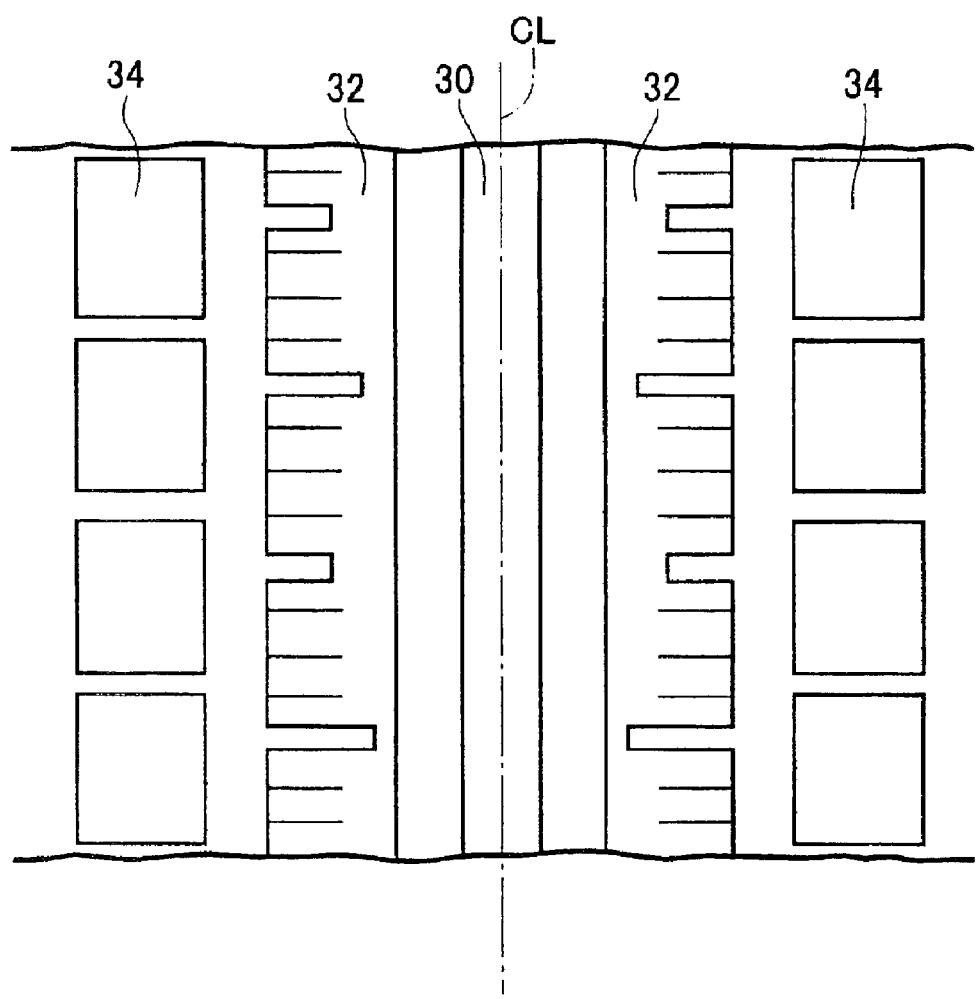
FIG. 29 is a top plan view of a tread and shows a block pattern of a tire of Example 9.

All the test tires have the pattern, as shown in FIG. 29, in which there are formed: a rib having the width of 25 mm on the tire equatorial plane; ribs having the width of 40 mm with the transverse grooves formed therein, the ribs being provided on the outer sides of the rib having the width of 25 mm; and blocks having the width of 40 mm on the outer sides of the ribs having the width of 40 mm. In the ribs having the transverse groove, there are formed the sipes at the interval of 5 to 10 mm. On the other hand, the maximum block has a circumferential length of 40 mm.

Tire of the Prior Art: The tire in which no smaller groove is formed in the groove walls.

Tire of Example 1: The tire in which smaller grooves (parallel to the tread surface) having a depth of 0.4 mm and a sectional shape of a triangle are formed in the walls of the circumferential groove at the pitch of 0.4 mm in the depthwise direction.

Tire of Example 2: The tire in which smaller grooves having a depth of 0.4 mm and inclined at 5 degrees with respect to the tangent to the tread surface are formed in the walls of the circumferential groove at the pitch of 0.4 mm in the circumferential directions.

Testing Methods: The test tires were assembled with the rims of 9JJ-17 under the internal pressure of 220 KPa and were attached to a passenger car. This car was tested for accelerations in the pool (having the smoothly polished concrete-paved road surface) of the depth of 10 mm from the speed of 50 Km/h. The hydroplaning occurrence rates were evaluated by the test driver.

The evaluations were exponentially expressed by setting the tire of the Prior Art Example to 100. It is expressed that the larger numerical value indicates the higher hydroplaning occurrence rate and the more excellent anti-hydroplaning performance.

TABLE 9

|  | Anti-Hydroplaning Perf. (for Concrete) |
| --- | --- |
| Prior Art | 100 |
| Example 1 | 105 |
| Example 2 | 108 |

It has been found out from the test results that the tire of Example 2 exhibits the high anti-hydroplaning performances over the prior art example and Example 1.

TEST EXAMPLE 10

In order to confirm the effects of the invention, there were prepared one kind of tire of the prior art of the size PSR205/55R16, one kind of tire of Comparative Example and three kinds of Example tires according to the present invention to evaluate the hydroplaning occurrence rates.

Here will be described the test tires.

All the test tires have the pattern, as shown in FIG. 23, in which there are formed: a rib having the width of 25 mm on the tire equatorial plane; ribs having the width of 35 mm with the transverse grooves formed therein, the ribs being provided on the outer sides of the rib having the width of 25 mm; and blocks having the width of 25 mm on the outer sides of the ribs having the width of 35 mm. On the other hand, the smaller grooves formed in the groove walls have a sectional shape shown in FIG. 14.

Tire of Prior Art Example: The tire having no smaller groove in the groove walls.

Tire of Comparative Example: The tire in which smaller grooves (parallel to the tread surface) having a depth of 0.4 mm are formed in the walls of the circumferential groove at the pitch of 0.4 mm in the depthwise direction. Here, L2 is 50% of L1 (as referred to FIG. 14).

Tire of Example 1: The tire in which smaller grooves (parallel to the tread surface) having a depth of 0.4 mm and a sectional shape of a triangle are formed in the walls of the circumferential groove at the pitch of 0.4 mm in the depthwise direction. Here, L2 is 60% of L1.

Tire of Example 2: The tire in which smaller grooves (parallel to the tread surface) having a depth of 0.4 mm and a sectional shape of a triangle are formed in the walls of the circumferential groove at the pitch of 0.4 mm in the depthwise direction. Here, L2 is 70% of L1.

Tire of Example 3: The tire in which smaller grooves (parallel to the tread surface) having a depth of 0.4 mm and a sectional shape of a triangle are formed in the walls of the circumferential groove at the pitch of 0.4 mm in the depthwise direction. Here, L2 is 90% of L1.

Testing Methods: The test tires were assembled with the rims of 6.5JJ-16 under the internal pressure of 220 KPa and were attached to a passenger car. This car was tested for accelerations in the pool of the depth of 8 mm from the speed of 50 Km/h. The hydroplaning occurrence rates were evaluated by the test driver.

The evaluations were exponentially expressed by setting the tire of the Prior Art Example to 100. It is expressed that the larger numerical value indicates the higher hydroplaning occurrence rate and the more excellent anti-hydroplaning performance.

TABLE 10

|  | Anti-Hydroplaning Perf. (for Concrete) |
| --- | --- |
| Prior Art | 100 |
| Com. Example | 98 |
| Example 1 | 101 |
| Example 2 | 102 |
| Example 3 | 103 |

It has been found out from the test results that the tires of Examples 1 to 3 exhibit the high anti-hydroplaning performances over the prior art example and Comparison.

With the constructions thus far described, the tire of the present invention can have the excellent effects to reduce the resistance to the water flowing in the grooves so that the drainage efficiency of the grooves can be improved to improve the wet performances.

What is claimed is:

1. A tire comprising:

a tread;

grooves formed in said tread for defining a plurality of blocks; and a plurality of smaller grooves formed in the walls of at least one of said grooves formed in said tread, so as to extend in a longitudinal direction of said at least one groove, wherein said smaller grooves have a depth set within a range of 0.01 to 0.5 mm and a pitch set within a range of 0.01 to 0.5 mm, wherein the walls in the vicinity of the intersection of said groove and another said groove are provided with turbulence generating zones for generating minute turbulences in a fluid flowing in the vicinity of the groove walls thereby to suppress separation of the fluid flowing in said groove, and wherein said turbulence generating zones have a multiplicity of recesses having a diameter within a range of 0.01 to 0.5 mm and a depth within a range of 0.01 to 0.5 mm.

2. A tire comprising:

a tread;

grooves formed in said tread for defining a plurality of blocks; and a plurality of smaller grooves formed in the walls of at least one of said grooves formed in said tread, so as to extend in a longitudinal direction of said at least one groove, wherein said smaller grooves have a depth set within a range of 0.01 to 0.5 mm and a pitch set within a range of 0.01 to 0.5 mm, wherein groove wall faces of a larger size and groove wall faces of a smaller size in the longitudinal direction are compared, and said smaller grooves have a larger depth and/or a larger pitch in the groove wall faces of the shorter size than in the groove wall faces of the longer size.

3. A tire comprising:

a tread;

grooves formed in said tread for defining a plurality of blocks;

a plurality of smaller grooves formed in the walls of at least one of said grooves formed in said tread, so as to extend in a longitudinal direction of said at least one groove, wherein said smaller grooves have a depth set within a range of 0.01 to 0.5 mm and a pitch set within a range of 0.01 to 0.5 mm;

a first land portion;

a second land portion defined by a plurality of grooves and adjoining said first land portion across a first groove; and a third land portion defined by a plurality grooves and adjoining said first land portion across said first groove, said third land portion having a wall face which faces the first groove and has a smaller size in the longitudinal direction than a wall face of the second land portion which faces the first groove, wherein in the wall face of said first land portion which faces the first groove, the depth and/or the pitch of said smaller grooves is larger in the portions confronting said third land portion than in the portions confronting said second land portion.

4. A tire comprising:

a tread;

grooves formed in said tread for defining a plurality of blocks; and a plurality of smaller grooves formed in the walls of at least one of said grooves formed in said tread, so as to extend in a longitudinal direction of said at least one groove, wherein said smaller grooves have a depth set within a range of 0.01 to 0.5 mm and a pitch set within a range of 0.01 to 0.5 mm, wherein the tread is provided with: a plurality of grooves extending along the tire circumferential direction; and a plurality of grooves extending along the tire widthwise direction, and wherein the walls of the grooves extending along the tire circumferential direction are free of said smaller grooves in a portion thereof intersecting prolongations of the grooves extending along the tire widthwise direction, as connected with the grooves extending along said tire circumferential direction.

5. A tire comprising:

a tread;

grooves formed in said tread for defining a plurality of blocks; and a plurality of smaller grooves formed in the walls of at least one of said grooves formed in said tread, so as to extend in a longitudinal direction of said at least one groove, wherein said smaller grooves have a depth set within a range of 0.01 to 0.5 mm and a pitch set within a range of 0.01 to 0.4 mm, the smaller grooves intentionally generate a relatively high number of minute vortexes along the walls of said at least one groove, thereby decreasing friction resistance between water and the groove wall surface, and wherein said smaller grooves are undulated to have an amplitude with respect to a reference line parallel to the surface of said tread, and wherein said smaller grooves have a period set within a range of 2 to 60 mm and an amplitude set within a range of 0.1 to 3 mm.

* * * * *